US012397554B2

(12) United States Patent
Tomimatsu

(10) Patent No.: US 12,397,554 B2

(45) Date of Patent: Aug. 26, 2025

(54) LIQUID EJECTION DEVICE AND METHOD FOR CONTROLLING LIQUID EJECTION DEVICE

(71) Applicant: SEIKO EPSON CORPORATION, Tokyo (JP)

(72) Inventor: Hiroyuki Tomimatsu, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 259 days.

(21) Appl. No.: 18/185,103

(22) Filed: Mar. 16, 2023

(65) Prior Publication Data

US 2023/0294409 A1 Sep. 21, 2023

(30) Foreign Application Priority Data

Mar. 17, 2022 (JP) ................................ 2022-042267

(51) Int. Cl.
*B41J 2/165* (2006.01)

(52) U.S. Cl.
CPC ....... *B41J 2/16517* (2013.01); *B41J 2/16535* (2013.01); *B41J 2/16544* (2013.01); *B41J 2002/1655* (2013.01)

(58) Field of Classification Search
CPC ................ B41J 2/16517; B41J 2/16535; B41J 2/16544; B41J 2002/1655
See application file for complete search history.

(56) References Cited

FOREIGN PATENT DOCUMENTS

| | | | |
|---|---|---|---|
| JP | 3969945 B2 * | 9/2007 | .......... B41M 7/0018 |
| JP | 2016-087954 A | 5/2016 | |

* cited by examiner

*Primary Examiner* — Justin Seo

(74) *Attorney, Agent, or Firm* — WORKMAN NYDEGGER

(57) ABSTRACT

A liquid ejection device includes a liquid ejection portion including a plurality of first nozzles configured to eject a first liquid containing an inorganic pigment and a plurality of second nozzles configured to eject a second liquid not containing a substance having a hardness the same as or higher than a hardness of the inorganic pigment contained in the first liquid, and a control portion, wherein the control portion performs the cleaning such that a proportion of the inorganic pigment of the first liquid in a mixed liquid, remaining on the nozzle surface, containing the first liquid and the second liquid is smaller than a proportion of the inorganic pigment in the first liquid, and then performs wiping of the nozzle surface.

9 Claims, 22 Drawing Sheets

LIQUID EJECTION DEVICE AND METHOD FOR CONTROLLING LIQUID EJECTION DEVICE

The present application is based on, and claims priority from JP Application Serial Number 2022-042267, filed Mar. 17, 2022, the disclosure of which is hereby incorporated by reference herein in its entirety.

BACKGROUND

1. Technical Field

The present disclosure relates to a liquid ejection device and a method for controlling a liquid ejection device.

2. Related Art

JP-A-2016-87954 discloses an ink-jet type liquid injection device including a liquid injection head that ejects an ink, which is an example of a liquid, from a plurality of nozzles, and a wiper that wipes a nozzle opening surface of the liquid injection head in which the nozzles open. The liquid injection head is an example of a liquid ejection portion, the nozzle opening surface is an example of a nozzle surface, the wiper is an example of a wiping portion, and the liquid injection device is an example of a liquid ejection device. Also, it is disclosed that the ink described above contains an inorganic pigment.

However, when the liquid ejected from the nozzles of the liquid ejection portion contains an inorganic pigment, as in the liquid ejection device disclosed in JP-A-2016-87954, the wiping of the nozzle surface by the wiping portion may cause damage to the nozzle surface due to the inorganic pigment.

SUMMARY

The liquid ejection device includes a liquid ejection portion including a plurality of first nozzles configured to eject a first liquid containing an inorganic pigment and a plurality of second nozzles configured to eject a second liquid not containing a substance having a hardness the same as or higher than a hardness of the inorganic pigment contained in the first liquid, a cleaning portion configured to perform maintenance on the liquid ejection portion by cleaning in which discharging of the first liquid from the plurality of first nozzles and discharging of the second liquid from the plurality of second nozzles are performed, a wiping portion including an absorbent member and configured to wipe, with the absorbent member, a nozzle surface provided with the plurality of first nozzles and the plurality of second nozzles, the absorbent member being configured to absorb a liquid, and a control portion configured to control the cleaning portion and the wiping portion, wherein the control portion performs the cleaning with the cleaning portion such that a proportion of the inorganic pigment of the first liquid in a mixed liquid, remaining on the nozzle surface, containing the first liquid and the second liquid is smaller than a proportion of the inorganic pigment in the first liquid, and then performs wiping of the nozzle surface with the wiping portion.

A method for controlling a liquid ejection device which includes a liquid ejection portion including a plurality of first nozzles configured to eject a first liquid containing an inorganic pigment and a plurality of second nozzles configured to eject a second liquid not containing a substance having a hardness the same as or higher than a hardness of the inorganic pigment contained in the first liquid, a cleaning portion configured to perform maintenance on the liquid ejection portion by cleaning in which discharging of the first liquid from the plurality of first nozzles and discharging of the second liquid from the plurality of second nozzles are performed, and a wiping portion including an absorbent member and configured to wipe, with the absorbent member, a nozzle surface provided with the plurality of first nozzles and the plurality of second nozzles, the absorbent member being configured to absorb a liquid, the method including performing the cleaning such that a proportion of the inorganic pigment of the first liquid in a mixed liquid, remaining on the nozzle surface, containing the first liquid and the second liquid is smaller than a proportion of the inorganic pigment in the first liquid, and performing wiping of the nozzle surface with the wiping portion after the cleaning is performed.

DESCRIPTION OF EXEMPLARY EMBODIMENTS

Figure 1:
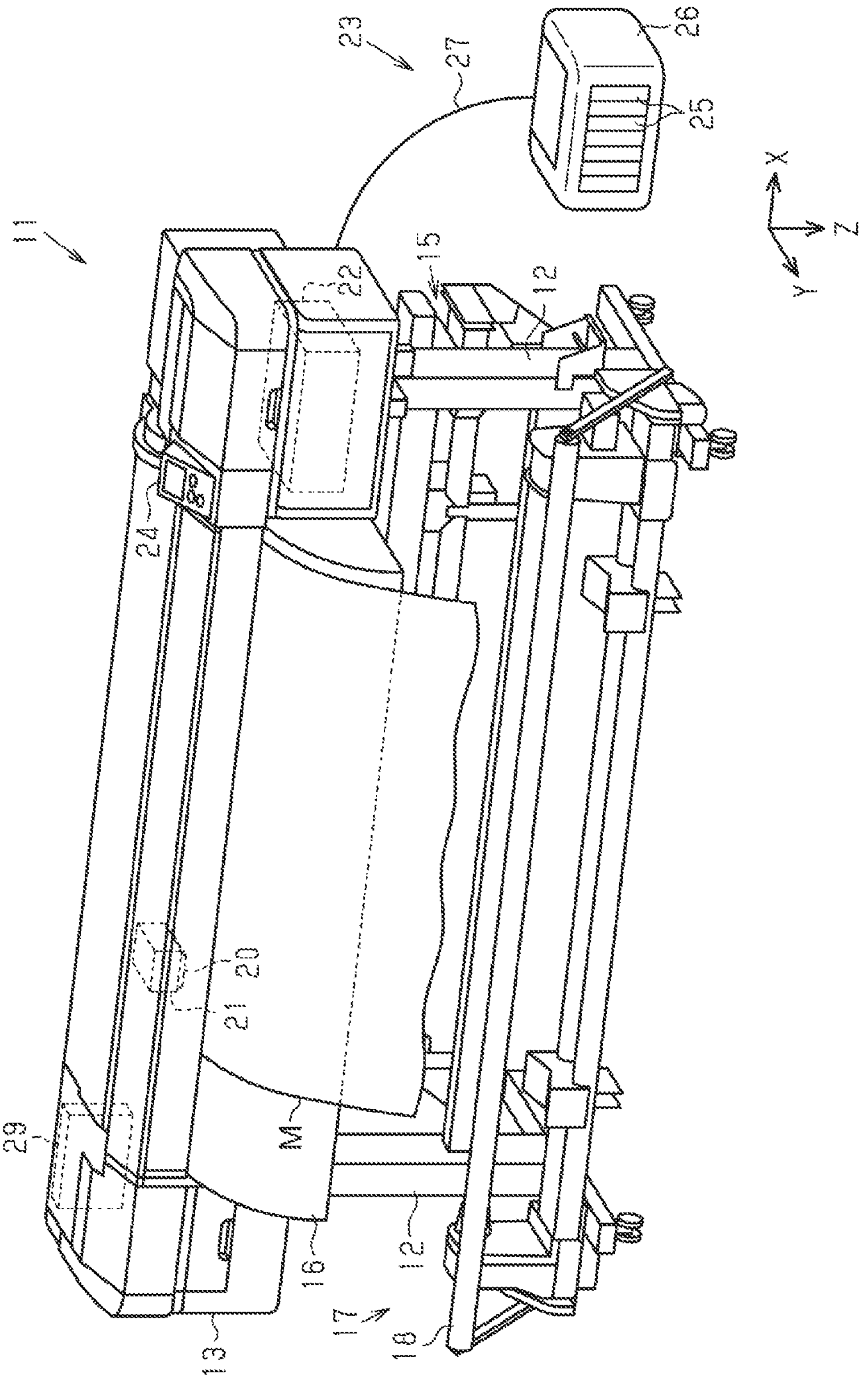
FIG. 1 is a perspective view illustrating a configuration of a liquid ejection device as an embodiment of the present disclosure.

Hereinafter, the present disclosure will be described based on embodiments. In the drawings, the same members are designated by the same reference numerals, and overlapping descriptions will be omitted. In the present specification, “the same”, “identical”, “simultaneously” not only refer to being exactly the same, but also include being the same in consideration of measurement errors, being the same in consideration of manufacturing variations of members, and being the same in that functions are not affected. Thus, for example, “both dimensions are the same” means that a dimensional difference between the two dimensions is within ±10%, may be within ±5%, and may be within ±3% of one dimension in consideration of measurement errors and manufacturing variations of members.

In addition, X, Y, and Z in each of the drawings represent three spatial axes orthogonal to each other. In the specification, directions along the axes are referred to as an X-axis direction, a Y-axis direction, and a Z-axis direction. When the direction is identified, with a positive direction defined as “+” and a negative direction defined as “−”, both positive and negative signs are used for direction notation. A direction in which an arrow points in each of the drawings is described as a + direction, and a direction opposite to the arrow is described as a − direction.

Additionally, the Z-axis direction indicates a direction of gravity, the +Z direction indicates a vertical downward direction, and the −Z direction indicates a vertical upward direction. A plane including the X axis and the Y axis is described as an X-Z plane, a plane including the X axis and the Z axis is described as an X-Z plane, and a plane including the Y axis and the Z axis is described as a Y-Z plane. Also, the X-Y plane is a horizontal plane. Furthermore, the three spatial axes of X, Y, and Z that are not limited to positive and negative directions will be described as the X axis, Y axis, and Z axis. In the following description, a direction along the X axis is also called a width direction X, a direction along the Y axis is also called a depth direction Y, and a direction along the Z axis is also called a direction Z of gravity.

1. Embodiment 1

A configuration of a liquid ejection device 11 according to Embodiment 1 will be described. The liquid ejection device 11 is, for example, an ink-jet type printer that ejects an ink, which is an example of a liquid, onto a medium M such as paper for printing. The liquid ejection device 11 of the embodiment performs printing by ejecting an ink on the medium M on which a reaction solution is ejected. The reaction solution includes a component that increases a viscosity of the ink and cures the ink by coming into contact with the ink. The reaction solution includes a component in which, when the reaction solution is mixed with the ink, a viscosity of a mixture of the ink and the reaction solution is higher than the viscosity of the ink, and thus the mixture is cured. The reaction solution is an example of a liquid. In the following description, any one of the ink, the reaction solution, the ink and the reaction solution, a mixed liquid of the ink and the reaction liquid, a mixed liquid of a plurality of types of inks, and a waste solution may be referred to as a liquid.

As illustrated in FIG. 1, the liquid ejection device 11 includes a pair of legs 12 and a housing 13 assembled on the legs 12. The liquid ejection device 11 includes a delivery portion 15 that unwinds and delivers the medium M wound in a roll shape, a guide portion 16 that guides the medium M discharged from the housing 13, and a recovery portion 17 that winds up and recovers the medium M. The liquid ejection device 11 includes a tension imparting mechanism 18 that imparts tension to the medium M recovered by the recovery portion 17.

The liquid ejection device 11 includes a liquid ejection portion 20 capable of ejecting a liquid, a carriage 21 that moves the liquid ejection portion 20, and a maintenance unit 22 that performs maintenance of the liquid ejection portion 20. The liquid ejection device 11 includes a liquid supply device 23 that supplies a liquid to the liquid ejection portion 20, and an operation panel 24 operated by a user. The carriage 21 reciprocates the liquid ejection portion 20 along the X axis. The liquid ejection portion 20 ejects the liquid supplied through the liquid supply device 23 while moving, and performs printing on the medium M.

The liquid supply device 23 includes a mounting portion 26 in which a plurality of liquid containers 25 containing a liquid are detachably mounted, and a supply flow passage 27 that supplies a liquid from the liquid containers 25 mounted in the mounting portion 26 to the liquid ejection portion 20.

The liquid ejection device 11 includes a control portion 29 that controls an operation of the liquid ejection device 11. The control portion 29 is constituted by a CPU, memory, and the like, for example. The control portion 29 controls the liquid ejection portion 20, the liquid supply device 23, the maintenance unit 22, and the like by the CPU executing a program stored in the memory.

Figure 2:
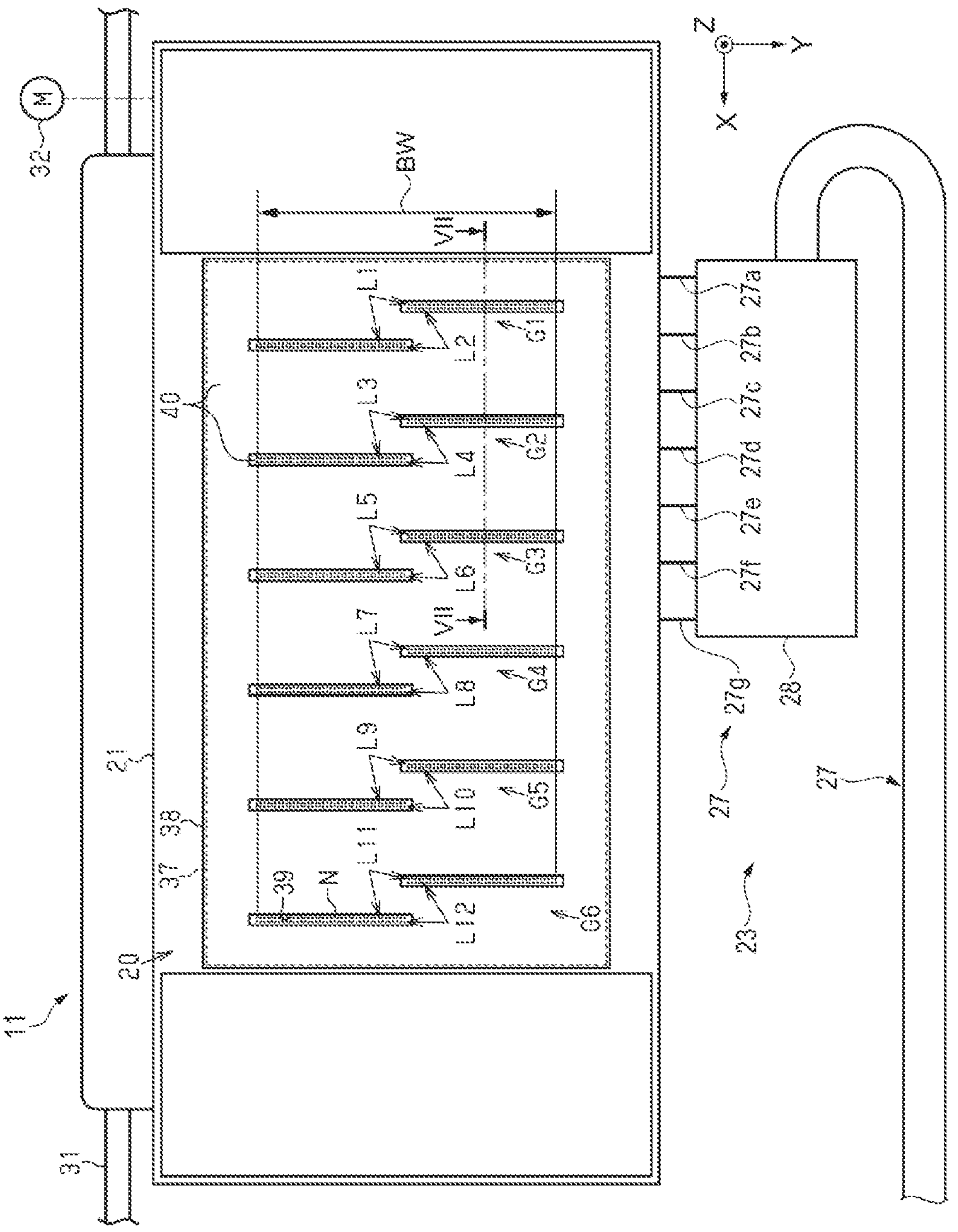
FIG. 2 is a schematic bottom view of a liquid ejection portion and a carriage.

As illustrated in FIG. 2, the liquid ejection device 11 includes a guide shaft 31 that supports the carriage 21 and a carriage motor 32 that moves the carriage 21. The guide shaft 31 extends in the width direction X. The control portion 29 controls driving of the carriage motor 32 to reciprocate the carriage 21 and the liquid ejection portion 20 along the guide shaft 31.

The liquid ejection portion 20 includes a nozzle forming member 37 in which a plurality of nozzles N are formed, and a cover member 38 that covers a part of the nozzle forming member 37. The cover member 38 is formed of a metal such as stainless steel, for example. A plurality of through holes 39 that pass through the cover member 38 in the direction Z of gravity are formed in the cover member 38. The cover member 38 covers the side of the nozzle forming member 37 on which the nozzles N are formed, such that the nozzles N are exposed from the through holes 39. A nozzle surface 40 is formed to include the nozzle forming member 37, and the cover member 38. Specifically, the nozzle surface 40 is constituted by the nozzle forming member 37 exposed from the through hole 39 and the cover member 38, and the nozzles N for ejecting a liquid are thus formed.

A surface that constitutes the nozzle surface 40 in the nozzle forming member 37 is covered by a liquid repellent film that repels a liquid such as ink. Among liquid repellent films, one having a significant water repellency is called a water repellent film. The liquid repellent film that covers the nozzle forming member 37 constituting the nozzle surface 40 may be configured to have a higher liquid repellency than that of the cover member 38.

The liquid repellent film is not particularly limited as long as it is a film having a liquid repellency, and may be formed by, for example, forming a molecular film of a metal alkoxide having a liquid repellency followed by a drying treatment, an annealing treatment, and the like. Any molecular film of a metal alkoxide may be used as long as it has a liquid repellency, but a metal alkoxide monomolecular film having a long-chain polymer group containing fluorine (long-chain RF group), or a metal acid salt monomolecular film having a liquid-repellent group, for example, a long-chain polymer group containing fluorine is desirable.

The metal alkoxide is not particularly limited, but for example, silicon, titanium, aluminum, and zirconium are generally used as the metal type. Examples of the long-chain RF group includes perfluoroalkyl chains and perfluoropolyether chains. Examples of an alkoxysilane having a long-chain RF group includes a silane coupling agent having a long-chain RF group. The liquid repellent film is not particularly limited, and for example, a silane coupling agent (SCA) film or a film described in Japanese Patent No. 4424954 can be used.

In addition, a conductive film may be formed at the nozzle forming member 37 on which the nozzles N are formed, and then the liquid repellent film may be formed at the conductive film, and, first, a plasma polymerization silicone (PPSi) film may be formed as a base film by plasma-polymerizing a silicon material, and then the liquid repellent film may be formed at the base film. The base film can cause the silicon material of the nozzle forming member 37 and the liquid repellent film to be conditioned.

The liquid repellent film may have a thickness of 1 nm or more and 30 nm or less, may have a thickness of 1 nm or more and 20 nm or less, and may have a thickness of 1 nm or more and 15 nm or less. The nozzle surface 40 has a superior liquid repellency by setting the thickness of the liquid repellent film to be within the ranges described above. Furthermore, deterioration of the liquid repellent film becomes relatively slow, and the liquid repellency can be maintained for a longer period of time by setting the thickness of the liquid repellent film to be within the range described above. In addition, Theses ranges are superior in terms of cost and ease of film formation.

In the liquid ejection portion 20, a large number of openings of the nozzles N for ejecting a liquid are arranged in one direction at regular intervals. The plurality of nozzles N constitute a nozzle row L. In the embodiment, the openings of the nozzles N are arranged at intervals in the depth direction Y to constitute nozzle rows L1 to L12. The nozzles N constituting one nozzle row L eject the same type of liquid. Among the nozzles N constituting the one nozzle row L, the nozzle N located at the rear in the depth direction Y and the nozzle N located at the front in the depth direction Y are formed so that positions thereof are shifted in the width direction X.

The nozzle rows L1 to L12 are arranged in the width direction, two rows at a time, close to each other. In the embodiment, two nozzle rows L arranged close to each other are referred to as nozzle groups G. Nozzle groups G1 to G6 are disposed at regular intervals in the width direction X in the liquid ejection portion 20. In the embodiment, dimensions of the nozzle groups G1 to G6 in the depth direction Y are the same. The nozzle groups G1 to G6 are provided in a region BW on the nozzle surface 40.

Specifically, the nozzle group G1 includes a nozzle row L1 that ejects a magenta ink and a nozzle row L2 that ejects a yellow ink. The nozzle group G2 includes a nozzle row L3 that ejects a cyan ink and a nozzle row L4 that ejects a black ink. The nozzle group G3 includes a nozzle row L5 that ejects a light cyan ink and a nozzle row L6 that ejects a light magenta ink.

The nozzle group G4 includes a nozzle row L7 and a nozzle row L8 that eject a reaction solution. The nozzle group G5 includes a nozzle row L9 that ejects a black ink and a nozzle row L10 that ejects a cyan ink. The nozzle group G6 includes a nozzle row L11 that ejects a yellow ink and a nozzle row L12 that ejects a magenta ink.

The ink of the embodiment is a so-called pigment ink containing water as a solvent and containing a pigment as a coloring component. Each of the magenta ink, the yellow ink, the cyan ink, the light cyan ink, and the light magenta ink contains an organic pigment as a coloring component and does not contain an inorganic substance. Further, the black ink contains an inorganic pigment as an inorganic substance. The black ink of the embodiment contains carbon black as a black inorganic pigment. Carbon black has a Mohs hardness of 1 to 2. Thus, the magenta ink, the yellow ink, the cyan ink, the light cyan ink, and the light magenta ink of the embodiment do not contain a substance having a hardness the same as or higher than the hardness of carbon black contained in the black ink.

Figure 7:
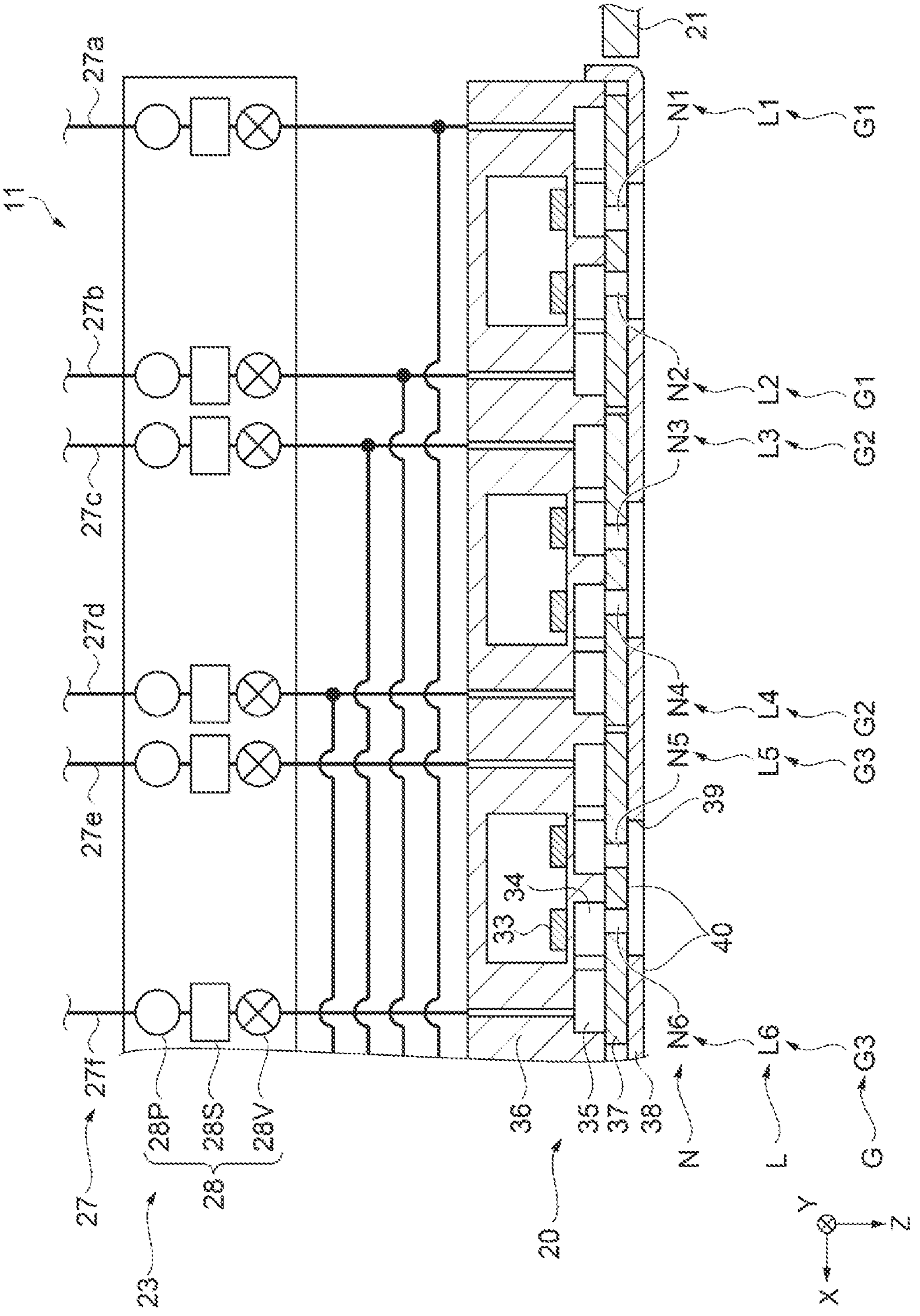
FIG. 7 is a schematic partial cross-sectional view illustrating a cross-section taken along line VII-VII illustrated in FIG. 2.

As illustrated in FIG. 7, the liquid ejection portion 20 includes a liquid chamber forming member 36 and an ejection element 33. The liquid chamber forming member 36 is stacked on the nozzle forming member 37 so as to form an individual liquid chamber 34 and a common liquid chamber 35. A plurality of individual liquid chambers 34 are provided corresponding to each of the nozzles N and communicates with each of the nozzles N. The common liquid chamber 35 communicates with the plurality of individual liquid chambers 34 provided corresponding to the plurality of nozzles N constituting each of the nozzle rows L. The liquid supplied from the supply flow passage 27 is supplied to the nozzles N via the common liquid chamber 35 and the individual liquid chambers 34. Then, the liquid in the individual liquid chambers 34 is ejected from the nozzles N by driving the ejection element 33.

As illustrated in FIGS. 2 and 7, the supply flow passage 27 of the liquid supply device 23 includes a supply flow passage 27*a* for supplying a magenta ink, a supply flow passage 27*b* that supplies a yellow ink, a supply flow passage 27*c* for supplying a cyan ink, a supply flow passage 27*d* for supplying a black ink, a supply flow passage 27*e* that supplies a light cyan ink, and a supply flow passage 27*f* for supplying a light magenta ink, and a supply flow passage 27*g* for supplying a reaction solution.

A liquid flow mechanism 28 through which a liquid is capable of flowing from the liquid container 25 toward the liquid ejection portion 20 is provided in each of the supply flow passages 27*a*, 27*b*, 27*c*, 27*d*, 27*e*, 27*f*, and 27*g*. The liquid flow mechanism 28 includes a feed pump 28P, a pressure adjustment chamber 28S, and an opening-closing valve 28V. The feed pump 28P, the pressure adjustment chamber 28S, and the opening-closing valve 28V are provided in the supply flow passage 27 so as to be arranged in the order of the feed pump 28P, the pressure adjustment chamber 28S, and the opening-closing valve 28V from the liquid container 25 side. The feed pump 28P is provided in the supply flow passage 27 to allow a liquid to flow from the liquid container 25 toward the liquid ejection portion 20. The pressure adjustment chamber 28S is provided in the supply flow passage 27 so as to detect a pressure of the liquid to be stored. The opening-closing valve 28V is provided in the supply flow passage 27 to open and close the supply flow passage 27.

The liquid flow mechanism 28 can adjust the pressure of the liquid supplied to the liquid ejection portion 20 to a predetermined pressure by driving control of the feed pump 28P based on the pressure of the liquid detected by the pressure adjustment chamber 28S. When the predetermined pressure is indicated as a gauge pressure at a position of the nozzle surface 40 in the Z-axis direction, for example, it is −0.5 kPa to −2 kPa when the liquid is ejected from the nozzle N by driving the ejection element 33, and is also, for example, +30 kPa to +50 kPa when pressurization cleaning to be described later is performed. Furthermore, the liquid flow mechanism 28 can supply the liquid adjusted to a predetermined pressure to the liquid ejection portion 20 by opening the opening-closing valve 28V, and can stop the supply of the liquid to the liquid ejection portion 20 by closing the opening-closing valve 28V.

For example, the nozzle N constituting the nozzle row L1 is referred to as a nozzle N1, the nozzle N constituting the nozzle row L2 is referred to as a nozzle N2, the nozzle N constituting the nozzle row L3 is referred to as a nozzle N3, the nozzle N constituting the nozzle row L4 is referred to as a nozzle N4, the nozzle N constituting the nozzle row L5 is referred to as a nozzle N5, and the nozzle N constituting the nozzle row L6 is referred to as a nozzle N6. Further, the nozzle N constituting the nozzle row L7 is referred to as a nozzle N7 (not illustrated), the nozzle N constituting the nozzle row L8 is referred to as a nozzle N8 (not illustrated), the nozzle N constituting the nozzle row L9 is referred to as a nozzle N9 (not illustrated), the nozzle N constituting the nozzle row L10 is referred to as a nozzle N10 (not illustrated), the nozzle N constituting the nozzle row L11 is referred to as a nozzle N11 (not illustrated), and the nozzle N constituting the nozzle row L12 is referred to as a nozzle N12 (not illustrated).

At this time, in the embodiment, the supply flow passage 27*a* branches between the liquid flow mechanism 28 and the liquid ejection portion 20 so as to supply the magenta ink to the plurality of nozzles N1 and the plurality of nozzles N12. Further, the supply flow passage 27*b* branches between the liquid flow mechanism 28 and the liquid ejection portion 20 so as to supply the yellow ink to the plurality of nozzles N2 and the plurality of nozzles N11. Further, the supply flow passage 27*c* branches between the liquid flow mechanism 28 and the liquid ejection portion 20 so as to supply the cyan ink to the plurality of nozzles N3 and the plurality of nozzles N10. Further, the supply flow passage 27*d* branches between the liquid flow mechanism 28 and the liquid ejection portion 20 so as to supply the black ink to the plurality of nozzles N4 and the plurality of nozzles N9. Furthermore, the supply flow passage 27*g* branches between the liquid flow mechanism 28 and the liquid ejection portion 20 so as to supply the reaction liquid to the plurality of nozzles N7 and the plurality of nozzles N8.

Figure 3:
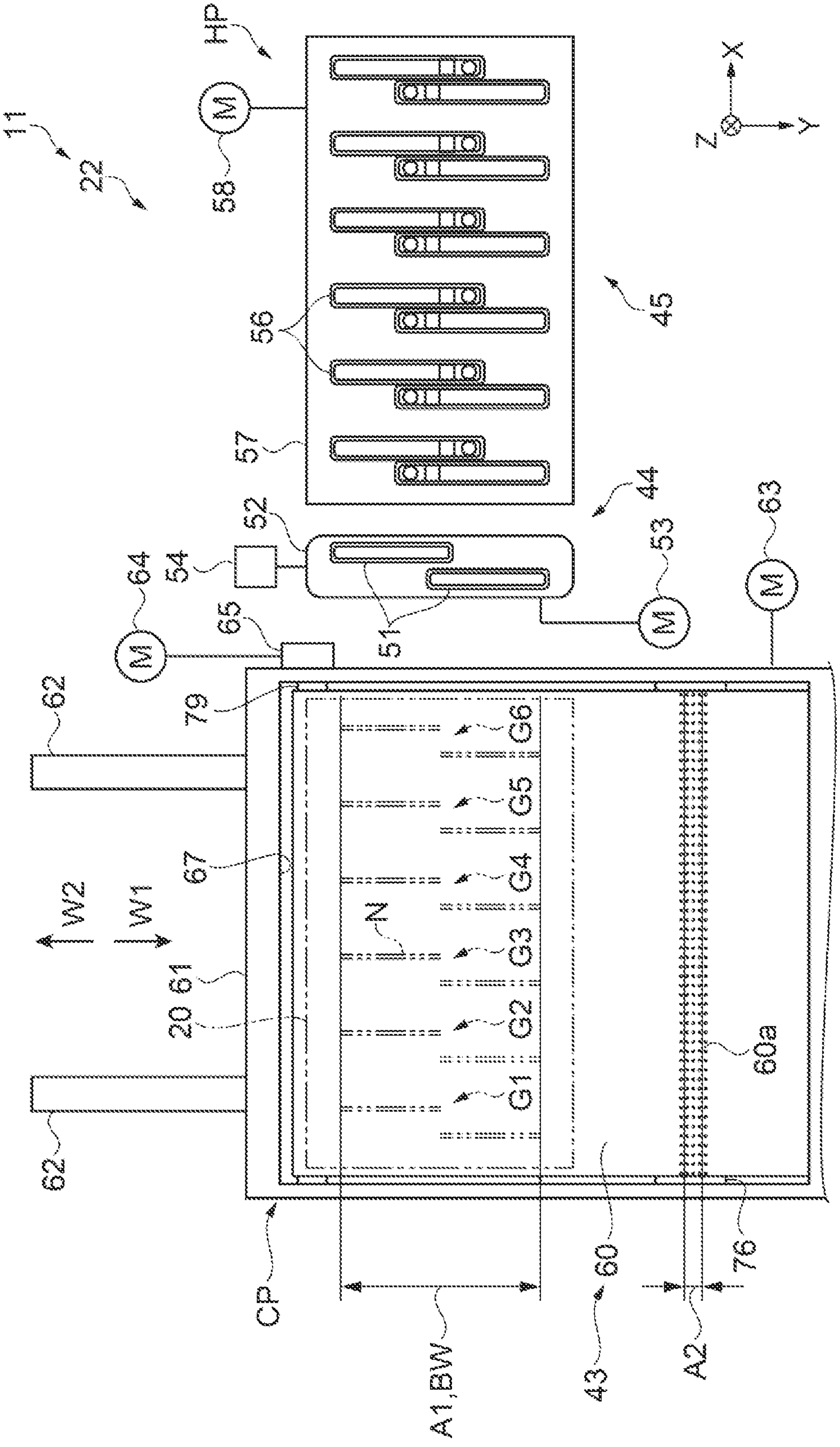
FIG. 3 is a schematic plan view of a maintenance unit.

Next, the maintenance unit 22 will be described. As illustrated in FIG. 3, the maintenance unit 22 includes a liquid collection device 43, a suction device 44, and a capping device 45 which are arranged in the width direction X. An upward direction that is the −Z direction of the capping device 45 is a home position HP of the liquid ejection portion 20. The home position HP is a starting point of movement of the liquid ejection portion 20. An upward direction that is the −Z direction of the liquid collection device 43 is a cleaning position CP of the liquid ejection portion 20. In FIG. 3, the liquid ejection portion 20 located at the cleaning position CP is indicated by a two point chain line.

The suction device 44 includes a suction cap 51, a suction holding body 52, a suction motor 53 that reciprocates the suction holding body 52 along the Z axis, and a pressure reduction mechanism 54 that reduces a pressure inside the suction cap 51. The suction motor 53 moves the suction cap 51 between a capping position and a retreat position. The capping position is a position at which the suction cap 51 is in contact with the liquid ejection portion 20 and surrounds the nozzle N. The retreat position is a position at which the suction cap 51 is separated from the liquid ejection portion 20. The suction device 44 of the embodiment surrounds one nozzle group G of the nozzle groups G1 to G6 by two suction caps 51.

The liquid ejection device 11 performs suction cleaning in which the liquid ejection portion 20 is positioned above the suction device 44, the suction cap 51 is positioned at the capping position to surround one nozzle group G, the inside of the suction cap 51 is depressurized, and the liquid is discharged from the nozzles N. That is, the suction device 44 receives the liquid discharged by the suction cleaning.

The capping device 45 includes a standby cap 56, a standby cap holding body 57, and a standby cap motor 58 that reciprocates the standby cap holding body 57 along the Z axis. The standby cap holding body 57 and the standby cap 56 are moved upward or downward by driving the standby cap motor 58. The standby cap 56 moves from a separated position that is a lower position in the +Z direction to the capping position that is an upper position, and comes into contact with the liquid ejection portion 20 stopped at the home position HP.

The standby cap 56 located at the capping position surrounds the openings of the nozzles N that constitute the nozzle groups G1 to G6. In this way, such maintenance in which the standby cap 56 surrounds the openings of the nozzles N is referred to as standby capping. The standby capping is a type of capping. Evaporation of the liquid from the nozzle N is suppressed by the standby capping.

Next, the liquid collection device 43 will be described. As illustrated in FIG. 3, the liquid collection device 43 includes a band-shaped member 60 capable of absorbing a liquid. The band-shaped member 60 is an example of a sheet-shaped absorbent member. The liquid collection device 43 includes a case 61 that accommodates the band-shaped member 60, a pair of rails 62 that extends along the Y axis, a wiping motor 63, a winding motor 64, and a power transmission mechanism 65 that transmits power of the winding motor 64. The case 61 includes an exposing opening 67 that exposes the band-shaped member 60.

Figure 4:
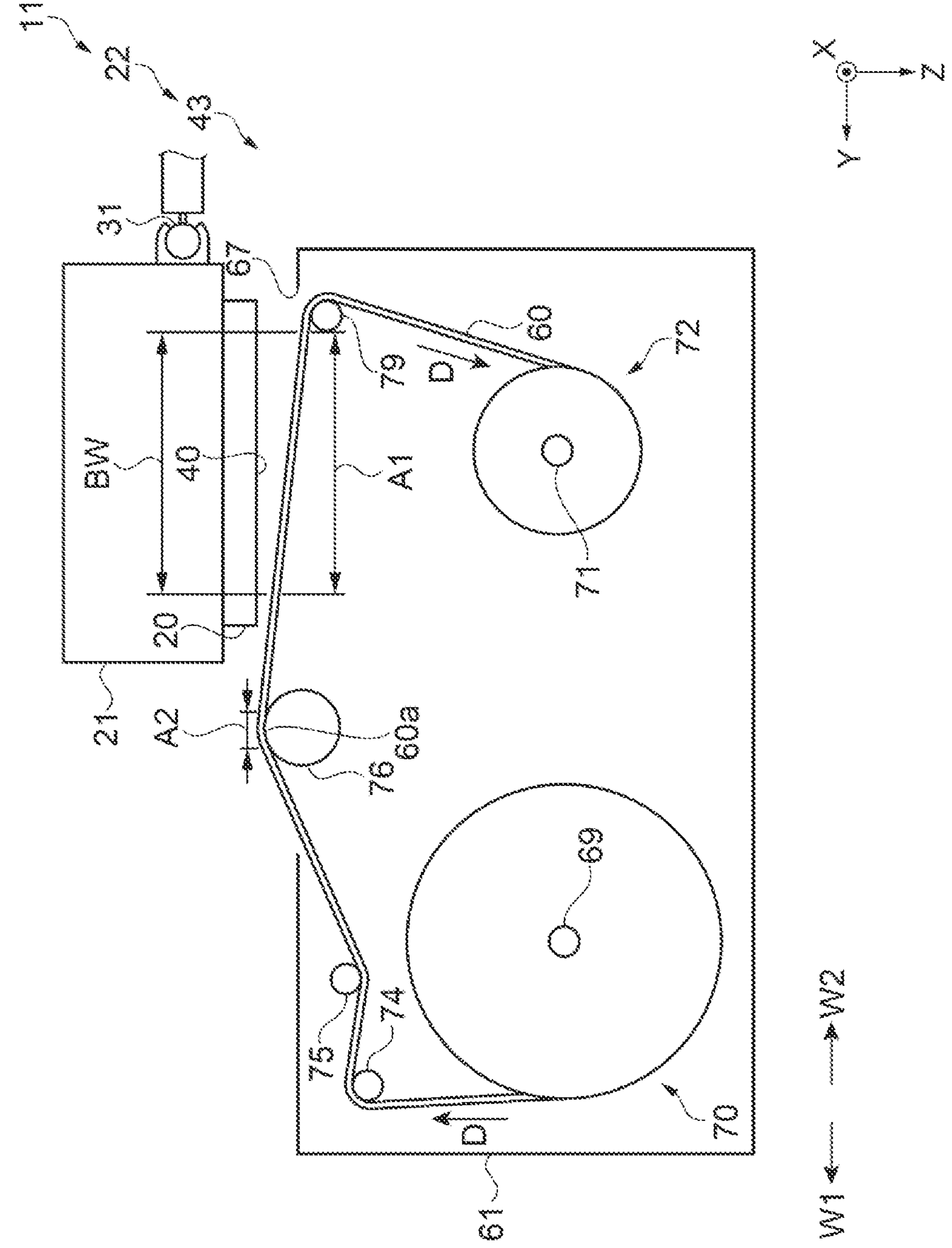
FIG. 4 is a schematic side view of a liquid collection device in which a case is located in a receiving position.
Figure 6:
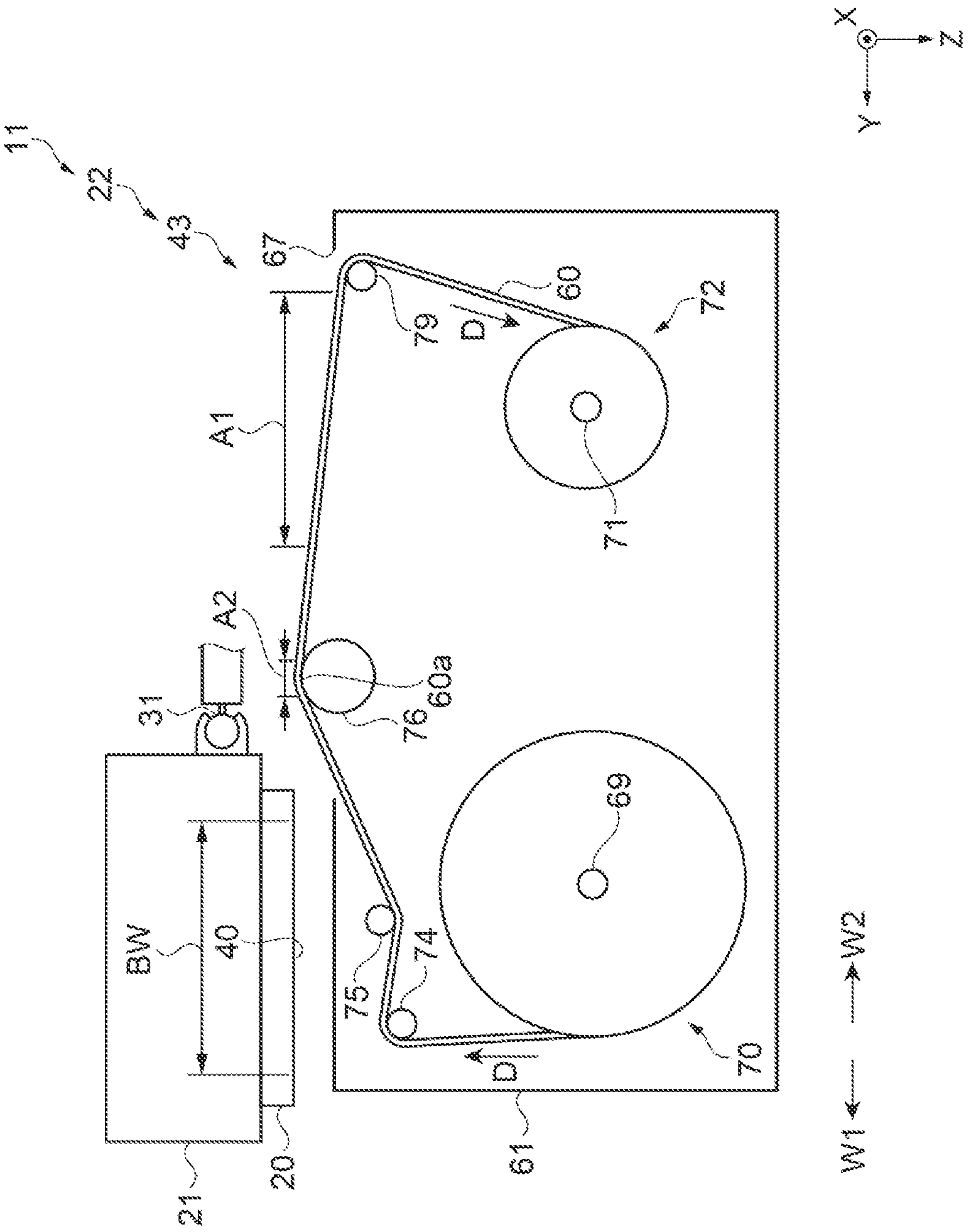
FIG. 6 is a schematic side view of the liquid collection device in which the case is located at a non-collection position.

The case 61 reciprocates along the Y axis on the rails 62 due to power of the wiping motor 63. Specifically, the case 61 moves between a receiving position illustrated in FIGS. 3 and 4 and a non-collection position illustrated in FIG. 6. A standby position of the case 61 in the embodiment is the receiving position. As illustrated in FIGS. 3 and 4, when the case 61 is located at the receiving position and the liquid ejection portion 20 is located at the cleaning position CP, the band-shaped member 60 faces the nozzle surface 40. Additionally, as illustrated in FIG. 6, when the case 61 is located at the non-collection position, and the liquid ejection portion 20 is located at the cleaning position CP, the case 61 faces the nozzle surface 40.

When the wiping motor 63 is driven forward, the case 61 located at the receiving position moves in a first wiping direction W1 parallel to the Y axis toward the non-collection position. When the wiping motor 63 is driven reversely, the case 61 located at the non-collection position moves in a second wiping direction W2 opposite to the first wiping direction W1 toward the receiving position.

The liquid ejection device 11 wipes the liquid ejection portion 20 in at least one of a process in which the case 61 of the liquid collection device 43 moves from the receiving position to the non-collection position and a process in which the case 61 moves from the non-collection position to the receiving position. The wiping is maintenance for wiping the nozzle surface 40 by the band-shaped member 60. In other words, the liquid collection device 43 is provided to be capable of wiping the nozzle surface 40. The liquid collection device 43 is an example of a wiping portion.

Additionally, the liquid ejection device 11 of the embodiment performs flushing with respect to the liquid collection device 43 located at the receiving position from the liquid ejection portion 20. The liquid collection device 43 receives a liquid ejected from the liquid ejection portion 20 by flushing. The flushing is maintenance for ejecting the liquid as a waste liquid by driving the ejection element 33 of the liquid ejection portion 20 for the purpose of either preventing or eliminating clogging of the nozzle N, or for the purpose of discharging foreign matter that has entered the nozzle N. The foreign matter also includes a liquid that is different from the liquid ejected from the nozzle N.

Furthermore, the liquid ejection device 11 may perform pressurization cleaning for discharging pressurized liquid from the nozzle N with respect to the liquid collection device 43 located at the receiving position from the liquid ejection portion 20. In this case, the liquid collection device 43 receives the liquid discharged by pressurization cleaning. The pressurization cleaning is an example of cleaning that discharges the liquid as the waste liquid for the purpose of normally maintaining a state of the liquid in either the liquid ejection portion 20 or the supply flow passage 27. The pressurization cleaning is maintenance that forcibly discharges the pressurized liquid from the nozzle N by controlling the driving of the liquid flow mechanism 28 of the liquid supply device 23. The liquid flow mechanism 28 is an example of a cleaning portion.

As illustrated in FIG. 4, the liquid collection device 43 includes an unwinding portion 70 including an unwinding shaft 69, and a winding portion 72 including a winding shaft 71. The unwinding portion 70 holds the band-shaped member 60 in a roll shape. The band-shaped member 60 unwound and delivered from the unwinding portion 70 is transported along a transport path to the winding portion 72. The liquid collection device 43 includes an upstream roller 74, a tension roller 75, a pressing portion 76, and a downstream roller 79 provided in order from the upstream along the transport path of the band-shaped member 60. The case 61 rotatably supports the unwinding shaft 69, the upstream roller 74, the tension roller 75, the pressing portion 76, the downstream roller 79, and the winding shaft 71 with the X-axis as the axial direction.

The winding shaft 71 is rotated by driving the winding motor 64. The winding portion 72 winds the band-shaped member 60 in a roll shape on the winding shaft 71. The winding portion 72 winds the band-shaped member 60 to move a portion of the band-shaped member 60 unwound from the unwinding portion 70 in a D direction. The D direction is a direction along the transport path of the band-shaped member 60 and a movement direction from the upstream unwinding portion 70 toward the downstream winding portion 72.

The power transmission mechanism 65 transmits a driving force of the winding motor 64 to the winding shaft 71. The power transmission mechanism 65 may couple the winding motor 64 with the winding shaft 71 when the case 61 is located at the standby position, and may decouple the winding motor 64 from the winding shaft 71 when the case 61 is separated from the standby position.

The tension roller 75 is disposed upstream in the D direction and in the +Z direction from the pressing portion 76. The tension roller 75 imparts tension to the band-shaped member 60 by pushing the band-shaped member 60 downward.

The pressing portion 76 of the embodiment is a roller on which the band-shaped member 60 is wound. The pressing portion 76 pushes the band-shaped member 60 unwound from the unwinding portion 70 from downward to upward, and causes the band-shaped member 60 to protrude from the exposing opening 67.

The contact region A2 is a region that comes into contact with the liquid ejection portion 20 when wiping. The pressing portion 76 may press the contact region A2 located in a contact position 60*a* on the band-shaped member 60, and may cause the liquid ejection portion 20 to come into contact with the contact region A2. In other words, the liquid collection device 43 wipes the liquid ejection portion 20 by moving the case 61 while the contact region A2 is in contact with the liquid ejection portion 20. In FIG. 3, the contact position 60*a* is illustrated to be hatched.

As illustrated in FIG. 4, when the case 61 is located at the receiving position and the liquid ejection portion 20 is located at the cleaning position CP, the band-shaped member 60 located in a receiving region A1 faces a region BW on the nozzle surface 40. In this state, the liquid ejection device 11 performs any one of the flushing and the pressurization cleaning. In this case, the liquid collection device 43 receives a liquid discharged by any one of the flushing and pressurization cleaning in the receiving region A1.

Figure 22:
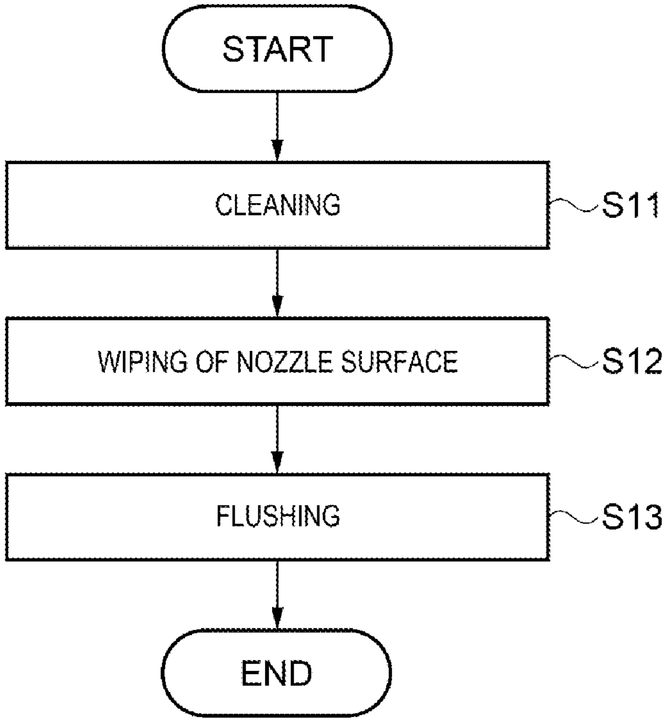
FIG. 22 is a flowchart illustrating a flow of processing when pressurization cleaning, wiping, and flushing are performed in order.

Next, with reference to a flowchart illustrated in FIG. 22, in the embodiment, a flow of processing when the control portion 29 performs the pressurization cleaning, the wiping, and the flushing in order as maintenance of the liquid ejection device 11 will be described. In the embodiment, the flow of processing when the control portion 29 performs the pressurization cleaning, the wiping, and the flushing in order corresponds to a method for controlling the liquid ejection device.

In Step S11, the control portion 29 performs the cleaning. Specifically, the control portion 29 performs the pressurization cleaning that forcibly discharges pressurized liquid from the nozzle N by controlling the driving of the liquid flow mechanism 28 of the liquid supply device 23. When the pressurization cleaning is performed, the control portion 29 positions the case 61 at the receiving position, as illustrated in FIGS. 3 and 4. Subsequently, the control portion 29 moves the liquid ejection portion 20 to the cleaning position CP and then stops it. Subsequently, the control portion 29 controls the liquid flow mechanism 28 to simultaneously open each of the opening-closing valves 28V provided in each of the supply flow passages 27*a*, 27*b*, 27*c*, 27*d*, 27*e*, 27*f*, and 27*g*, and thus supplies the pressurized liquid to each of the nozzles N as indicated by arrows in FIG. 8.

Figure 8:
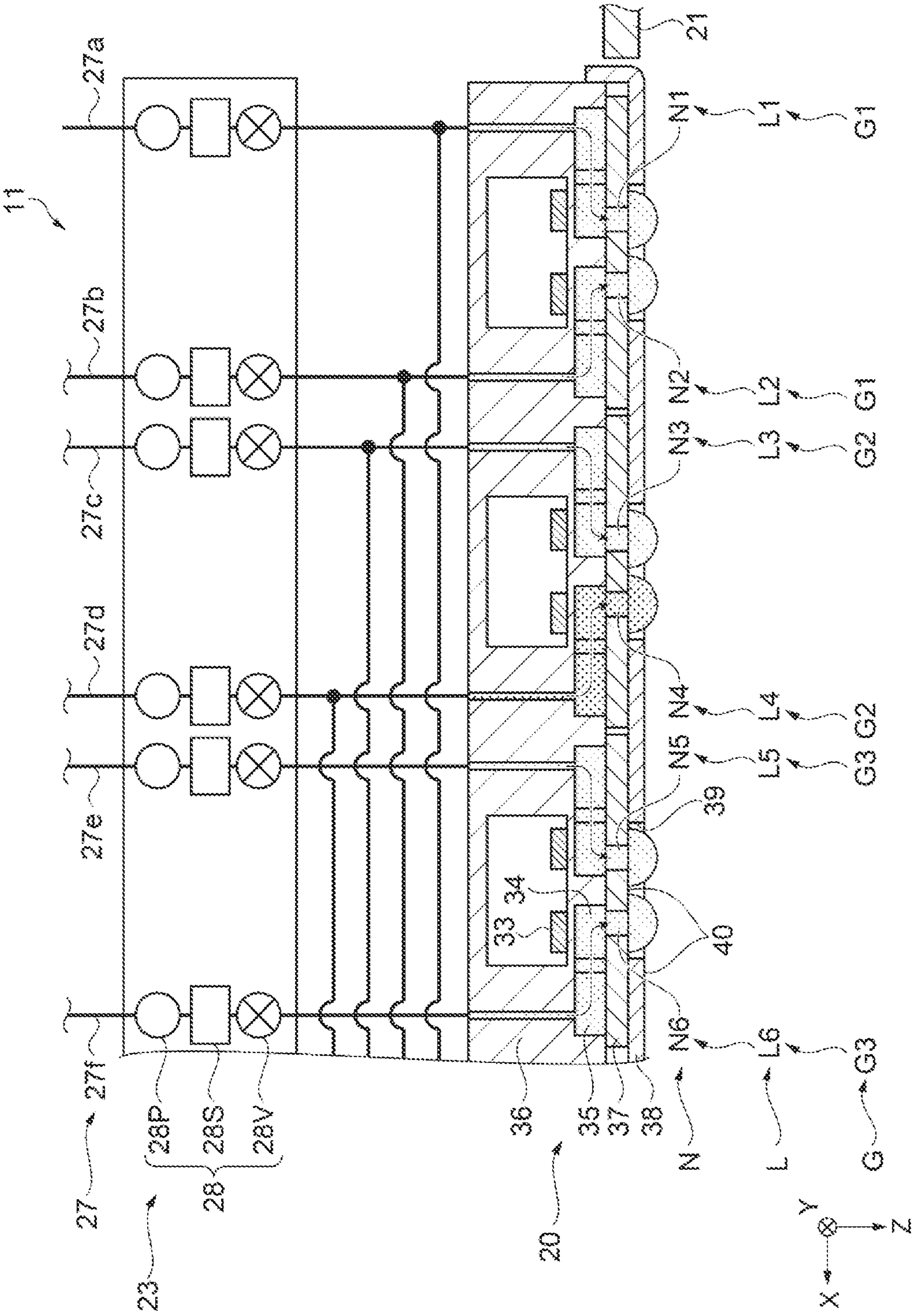
FIG. 8 is a schematic partial cross-sectional view illustrating a state of a vicinity of the liquid ejection portion in the pressurization cleaning.

As illustrated in FIG. 8, the pressurized liquid supplied to each of the nozzles N is discharged from each of the nozzles N, and remains in an inflated state in a droplet shape from the nozzle surface 40.

For example, the black ink is discharged from the plurality of nozzles N4 constituting the nozzle row L4 of the nozzle group G2, and is suspended and remains in the inflated state in a droplet shape from the nozzle surface 40. Additionally, the cyan ink is discharged from the plurality of nozzles N3 adjacent to the nozzle N4 in the X-axis direction and constituting the nozzle row L3 of the nozzle group G2, and is suspended and remains in the inflated state in a droplet shape from the nozzle surface 40. The nozzle N4 is an example of a first nozzle, and the black ink is an example of a first liquid. The nozzle N3 is an example of a second nozzle, and the cyan ink is an example of a second liquid.

Figure 9:
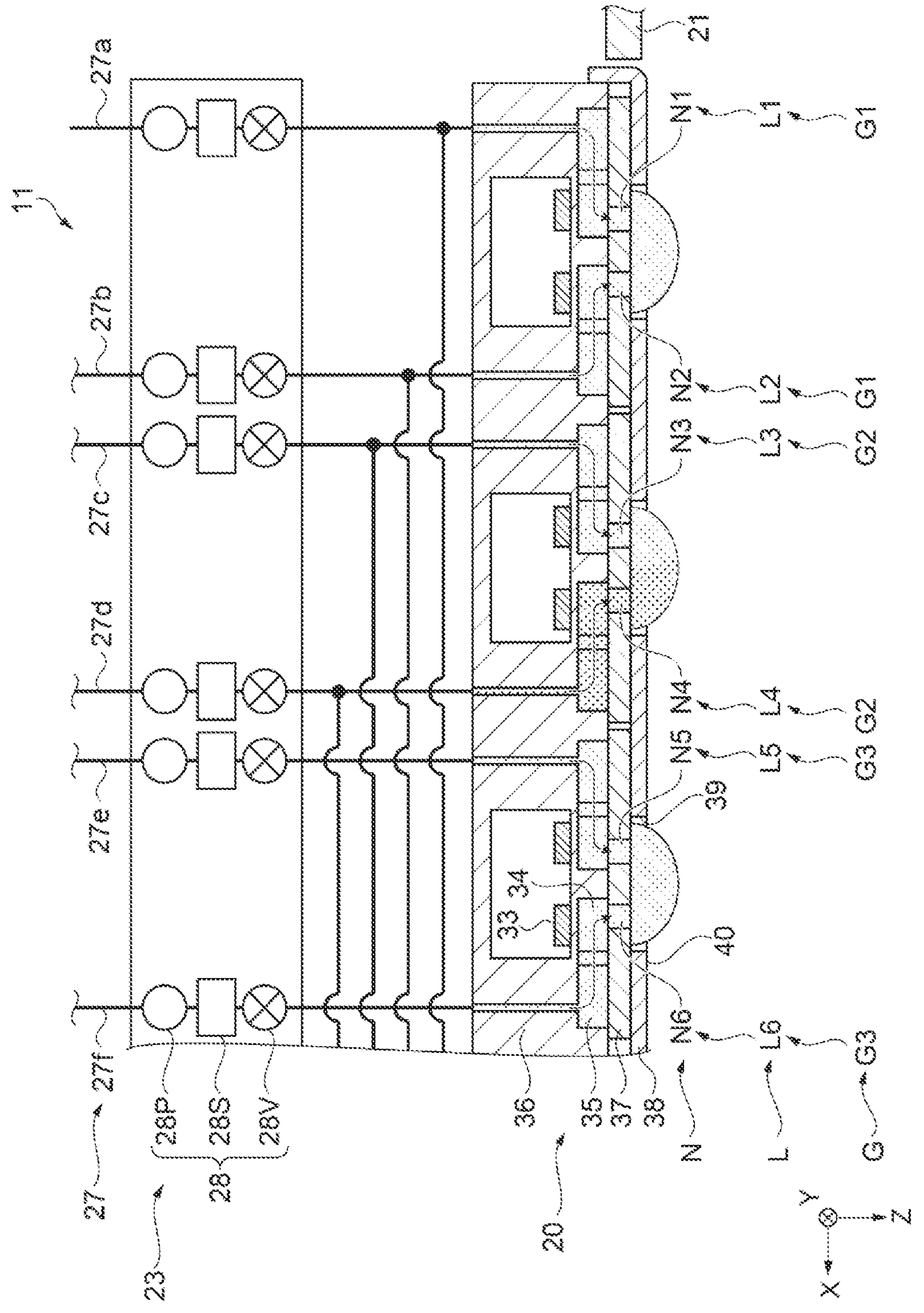
FIG. 9 is a schematic partial cross-sectional view illustrating a state of the vicinity of the liquid ejection portion in the pressurization cleaning.

As illustrated in FIG. 9, the control portion 29 continues supplying of the pressurized liquid to each of the nozzles N. As a result, the liquid that is discharged from each of the nozzles N and inflated in the droplet shape from the nozzle surface 40 further expands to form a large droplet shape. Then, adjacent droplets inflated in the droplet shape from the nozzle surface 40 are coupled to each other to be the inflated state in a large droplet shape.

For example, a dimension between a center of the nozzles N of one nozzle row L constituting the nozzle group G and a center of the nozzles N of the other nozzle row L which are closest and adjacent thereto is referred to as a nozzle-to-nozzle dimension ND.

In addition, when the droplet-shaped liquid discharged from the nozzle N and suspended from the nozzle surface 40 drops without being coupled to the adjacent droplets, a dimension from an outer edge of the droplet on the nozzle surface 40 to the center of the nozzle N is referred to as a droplet radius DR. At this time, the nozzle-to-nozzle dimension ND is set to a dimension smaller than twice the droplet radius DR. Also, the nozzle-to-nozzle dimension ND is set to be larger than a nozzle center-to-center dimension of the nozzles N constituting the nozzle row L. From the above point of view, it is desirable that the nozzle-to-nozzle dimension ND be set to 0.3 mm to 3 mm. In the embodiment, the nozzle-to-nozzle dimension ND is set to 1.01 mm.

Thus, when the liquid is discharged from the nozzles N of one nozzle row L constituting the nozzle group G and the nozzles N of the other nozzle row L, each of the liquids discharged from each of nozzles N and inflated in a droplet shape from the nozzle surface 40 is coupled to each other to form a mixed liquid before the liquids drop from the nozzle surface 40.

For example, a black ink discharged from the nozzle N4 and inflated in a droplet shape from the nozzle surface 40, and a cyan ink discharged from the nozzle N3 and inflated in a droplet shape from the nozzle surface 40 are coupled to each other and are in the inflated state in a large droplet shape. Thus, a mixed liquid containing the black ink and the cyan ink is in the inflated state in a droplet shape on the nozzle surface 40 in which the nozzles N3 and N4 constituting the nozzle group G2 are open. Thus, a proportion of carbon black of the black ink in the mixed liquid that remains in the inflated state in a droplet shape is smaller on the nozzle surface 40 than a proportion of the carbon black in the black ink.

Figure 10:
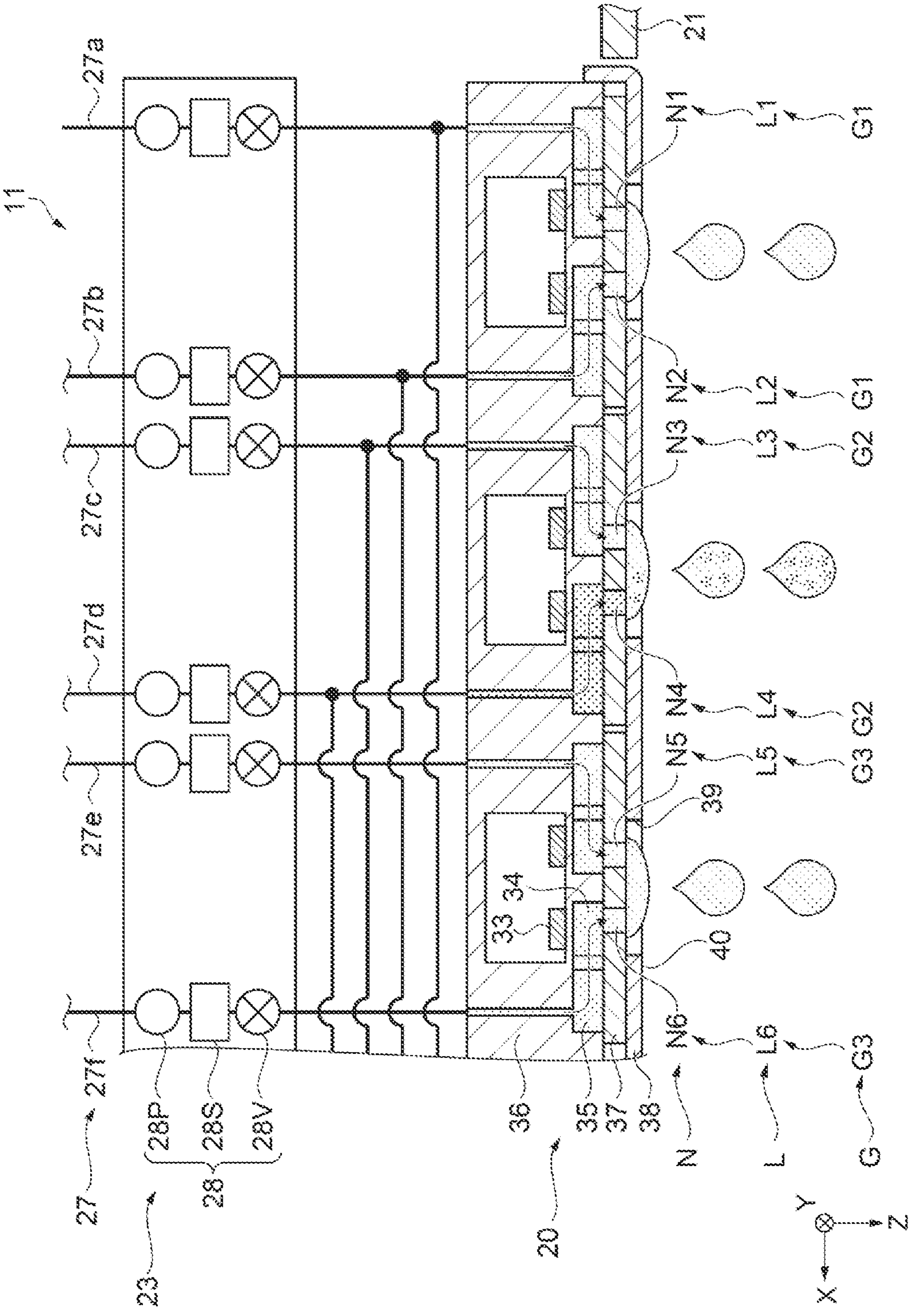
FIG. 10 is a schematic partial cross-sectional view illustrating a state of the vicinity of the liquid ejection portion in the pressurization cleaning.

As illustrated in FIG. 10, a part of the mixed liquid in which adjacent droplets are coupled to each other and become larger than a size that can remain on the nozzle surface 40 drops from the nozzle surface 40. As a result, an amount of droplet-shaped liquid that remains on the nozzle surface 40 is reduced. The control portion 29 continues the supplying of the pressurized liquid to each of the nozzles N. Thus, enlargement of the droplets on the nozzle surface 40, dropping of the droplets from the nozzle surface 40, and contraction of the droplets on the nozzle surface 40 are repeated. As illustrated in FIG. 4, the droplets that drop from the nozzle surface 40 are received in the receiving region A1 set on the band-shaped member 60 of the liquid collection device 43.

Figure 11:
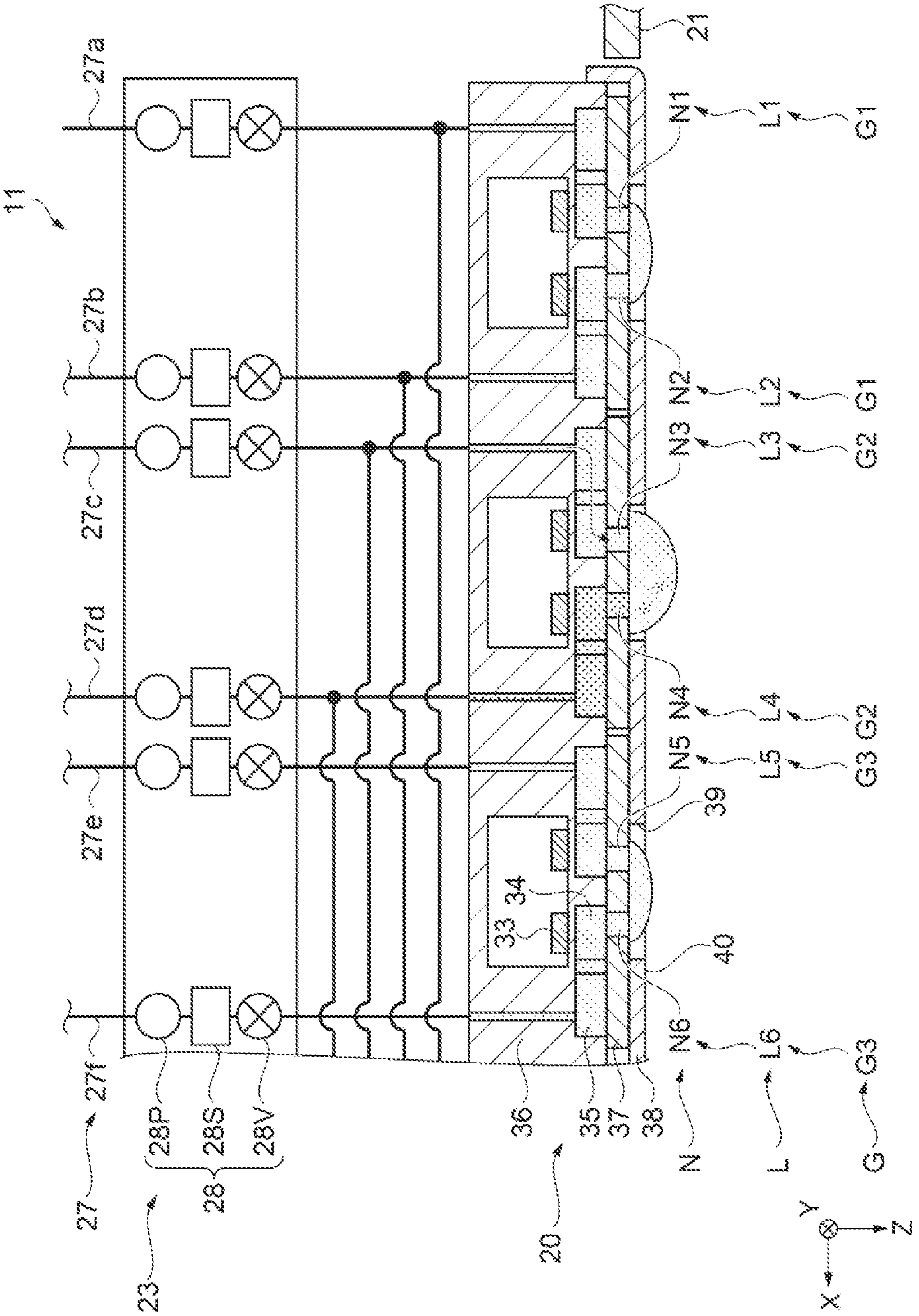
FIG. 11 is a schematic partial cross-sectional view illustrating a state of the vicinity of the liquid ejection portion in the pressurization cleaning.

Subsequently, when a supply amount of liquid to each of the nozzles N reaches a set amount A, the control portion 29 controls the liquid flow mechanism 28 to close each of the opening-closing valves 28V provided in the supply flow passages 27*a*, 27*b*, 27*d*, 27*e*, 27*f*, and 27*g*. Thus, the control portion 29 stops the supplying of the liquid from the supply flow passages 27*a*, 27*b*, 27*d*, 27*e*, 27*f*, and 27*g*. As a result, an amount of droplet-shaped liquid remaining on the nozzle surface 40 illustrated in FIG. 11 is less than an amount of droplet-shaped liquid remaining on the nozzle surface 40 illustrated in FIG. 9. In other words, the amount of droplet-shaped mixed liquid remaining on the nozzle surface 40 in which the nozzles N3 and N4 constituting the nozzle group G2 are open is also reduced. At this time, for example, a supply amount of the black ink supplied to the nozzle N4 is a set amount A. The set amount A is the same as or greater than an amount of liquid required for the pressurized liquid supplied to each of the nozzles N to be discharged from each of the nozzles N and to drop from the nozzle surface 40.

On the other hand, the control portion 29 continues to supply the pressurized liquid to the nozzles N3 and N10 by continuing an opening state of the opening-closing valve 28V provided in the supply flow passage 27*c*. As a result, as illustrated in FIG. 11, for example, the cyan ink supplied from the supply flow passage 27*c* is mixed through the nozzle N3 as indicated by an arrow with the droplets of the mixed liquid remaining on the nozzle surface 40 in which the nozzles N3 and N4 constituting the nozzle group G2 are open. As a result, the proportion of carbon black of the black ink in the mixed liquid that remains on the nozzle surface 40 in the inflated state in a droplet shape is smaller than the proportion of carbon black in the black ink, and is smaller than the proportion of the carbon black in the droplet-shaped mixed liquid illustrated in FIGS. 9 and 10.

Figure 12:
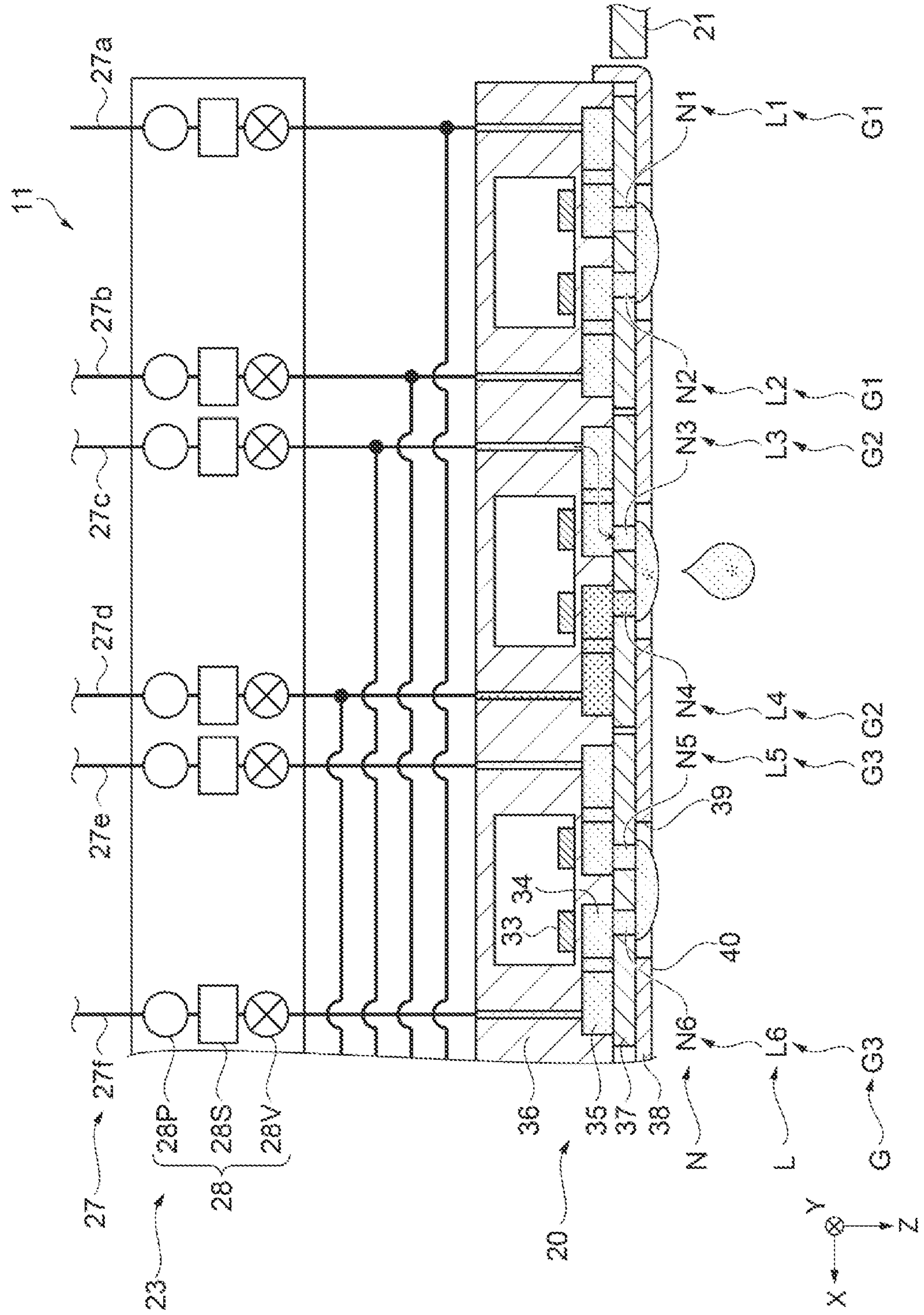
FIG. 12 is a schematic partial cross-sectional view illustrating a state of the vicinity of the liquid ejection portion in the pressurization cleaning.

As illustrated in FIG. 12, a part of a mixed liquid in which a cyan ink is supplied through the nozzle N3 and becomes larger than a size that can remain on the nozzle surface 40 drops from the nozzle surface 40. As a result, the amount of droplet-shaped liquid that remains on the nozzle surface 40 in which the nozzles N3 and N4 constituting the nozzle group G2 are open is reduced. The control portion 29 may continue the supplying of the pressurized cyan ink to each of the nozzles N3 and N10 as necessary. As a result, the enlargement of the droplets on the nozzle surface 40, the dropping of the droplets from the nozzle surface 40, and the contraction of the droplets on the nozzle surface 40 are repeated, so that the droplets of the mixed liquid that remain on the nozzle surface 40 in which the nozzles N3 and N4 constituting the nozzle group G2 are open are substantially droplets of the cyan ink.

Figure 13:
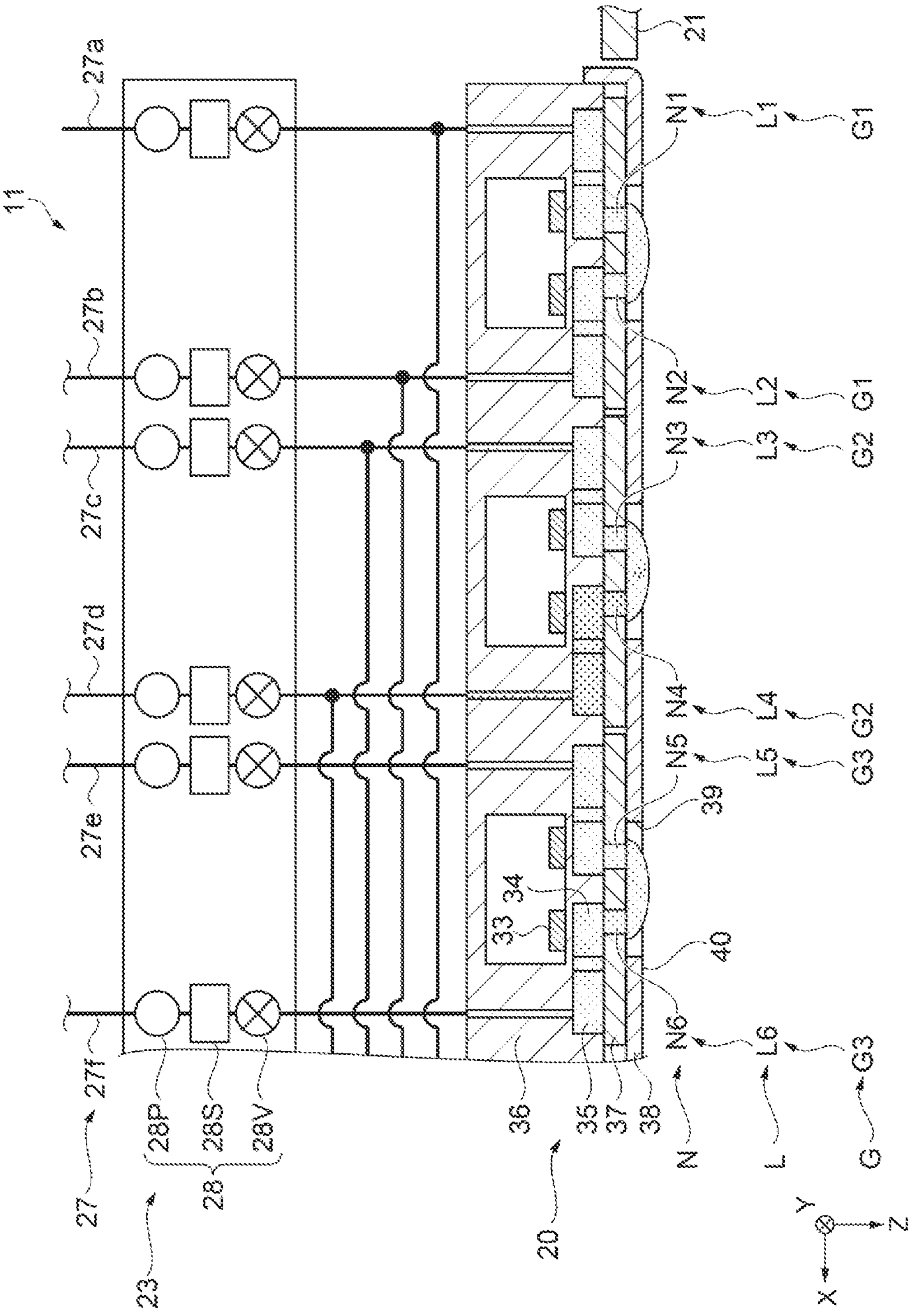
FIG. 13 is a schematic partial cross-sectional view illustrating a state of the vicinity of the liquid ejection portion in the pressurization cleaning.

Subsequently, as illustrated in FIG. 13, when the supply amount of liquid to each of the nozzles N3 and N10 reaches a set amount B, the control portion 29 controls the liquid flow mechanism 28 to close the opening-closing valve 28V provided in the supply flow passage 27*c* to stop the supplying of the cyan ink from the supply flow passage 27*c* and thus to end the pressurization cleaning. At this time, an amount of droplet-shaped liquid that remains on the nozzle surface 40 in which the nozzles N3 and N4 constituting the nozzle group G2 are open in FIG. 13 is less than an amount of droplet-shaped liquid that remains on the nozzle surface 40 in which the nozzle N3 and N4 constituting the nozzle group G2 are open in FIG. 11. In other words, the amount of droplet-shaped mixed liquid that remains on the nozzle surface 40 in which the nozzles N3 and N4 constituting the nozzle group G2 are open is also reduced.

Since the set amount B is greater than the set amount A, for example, the amount of the cyan ink discharged from the nozzle N3 is greater than the amount of the black ink discharged from the nozzle N4 in the pressurization cleaning. In addition, in the pressurization cleaning, the control portion 29 stops the supplying of the black ink to the nozzle N4 and then continues the supplying of the cyan ink to the nozzle N3. In other words, in the pressurization cleaning, the control portion 29 completes discharging of the cyan ink after discharging of the black ink is completed. When the processing of Step S11 is performed, the control portion 29 causes the processing to proceed to Step S12.

In Step S12, the control portion 29 performs the wiping of the nozzle surface 40. As illustrated in FIG. 4, after the pressurization cleaning is performed, the control portion 29 reversely drives the wiping motor 63 in a state in which the case 61 is located at the receiving position, and moves the case 61 in a second wiping direction W2.

Figure 5:
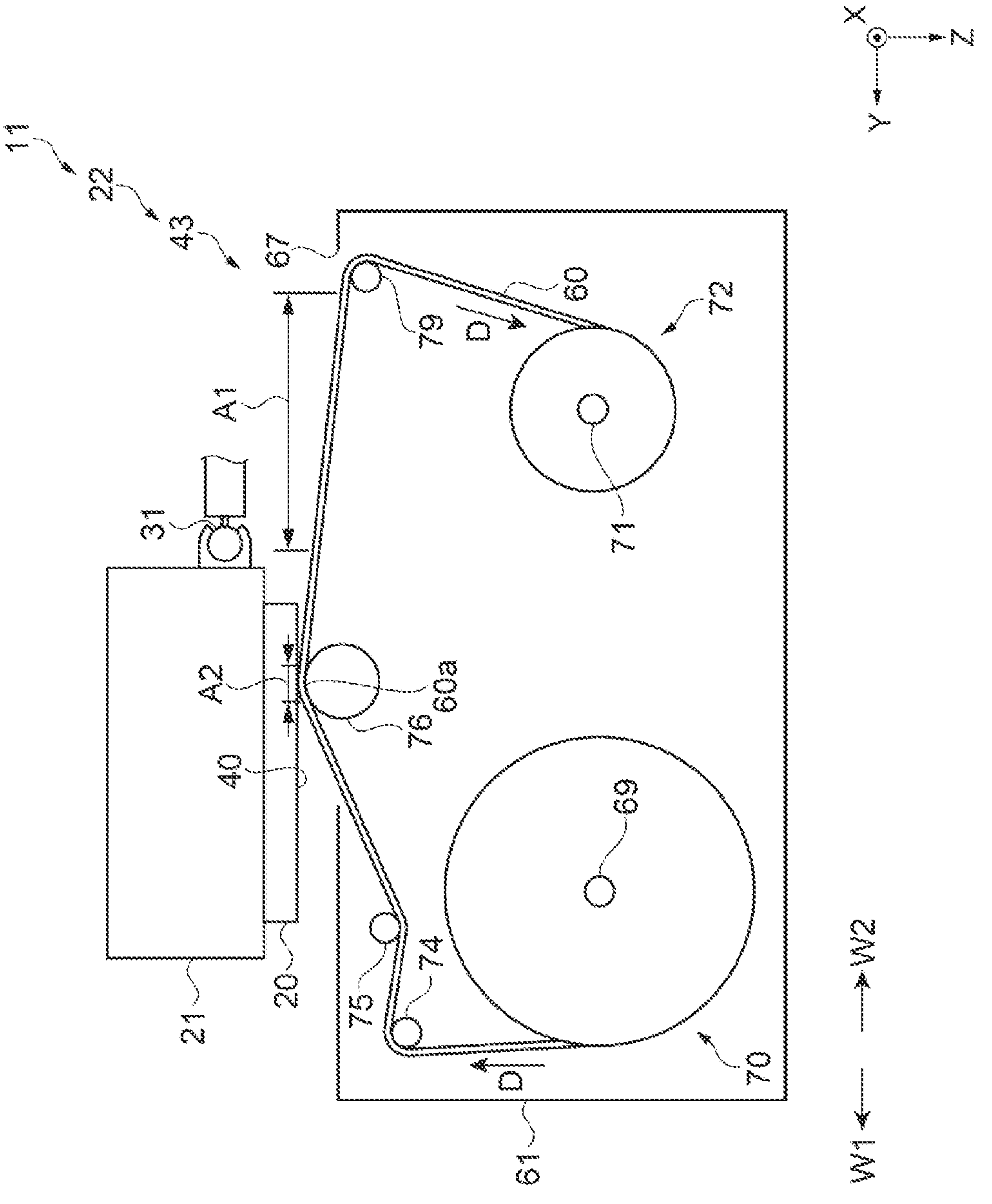
FIG. 5 is a schematic side view of the liquid collection device for wiping a liquid ejection portion.

As illustrated in FIG. 5, the liquid collection device 43 wipes the nozzle surface 40 by bringing the contact region A2 into contact with the liquid ejection portion 20. Specifically, the liquid collection device 43 performs the wiping by causing the pressing portion 76 to press the contact region A2 of the band-shaped member 60 against the nozzle surface 40 and moving the case 61 in a state in which the band-shaped member 60 is located between the pressing portion 76 and the nozzle surface 40.

As illustrated in FIG. 6, when the case 61 moves to the non-collection position, the control portion 29 stops the driving of the wiping motor 63 and moves the liquid ejection portion 20 from the cleaning position CP. When the processing of Step S12 is performed, the control portion 29 causes the processing to proceed to Step S13.

In Step S13, the control portion 29 performs the flushing. The control portion 29 drives the wiping motor 63 forward to move the case 61 in a first wiping direction W1. Subsequently, the control portion 29 moves the liquid ejection portion 20 to the cleaning position CP in a state in which the case 61 is located at the receiving position.

Then, as illustrated in FIG. 4, the control portion 29 drives the ejection elements 33 of the liquid ejection portion 20 and performs the flushing, in which a liquid is ejected from the nozzle N of the liquid ejection portion 20, with respect to the receiving region A1 of the band-shaped member 60 that faces the liquid ejection portion 20. When the processing of Step S13 is performed, the control portion 29 ends the processing when the pressurization cleaning, the wiping, and the flushing are performed in order.

In the pressurization cleaning, the control portion 29 may set a timing to start supplying of the pressurized cyan ink to the nozzles N3 and N10 later than a timing to start the supplying of the pressurized liquid to the nozzle N other than the nozzles N3 and N10. For example, when the pressurization cleaning is performed, in Step S11, the control portion 29 controls the liquid flow mechanism 28 to simultaneously open each of the opening-closing valves 28V provided in the supply flow passages 27*a*, 27*b*, 27*d*, 27*e*, 27*f*, and 27*g*, and supplies the pressurized liquid to the nozzle N other than the nozzles N3 and N10. At this time, the control portion 29 does not open the opening-closing valve 28V provided in the supply flow passage 27*c*. Thus, for example, as illustrated in FIG. 14, the cyan ink is not supplied to the nozzle N3.

Figure 14:
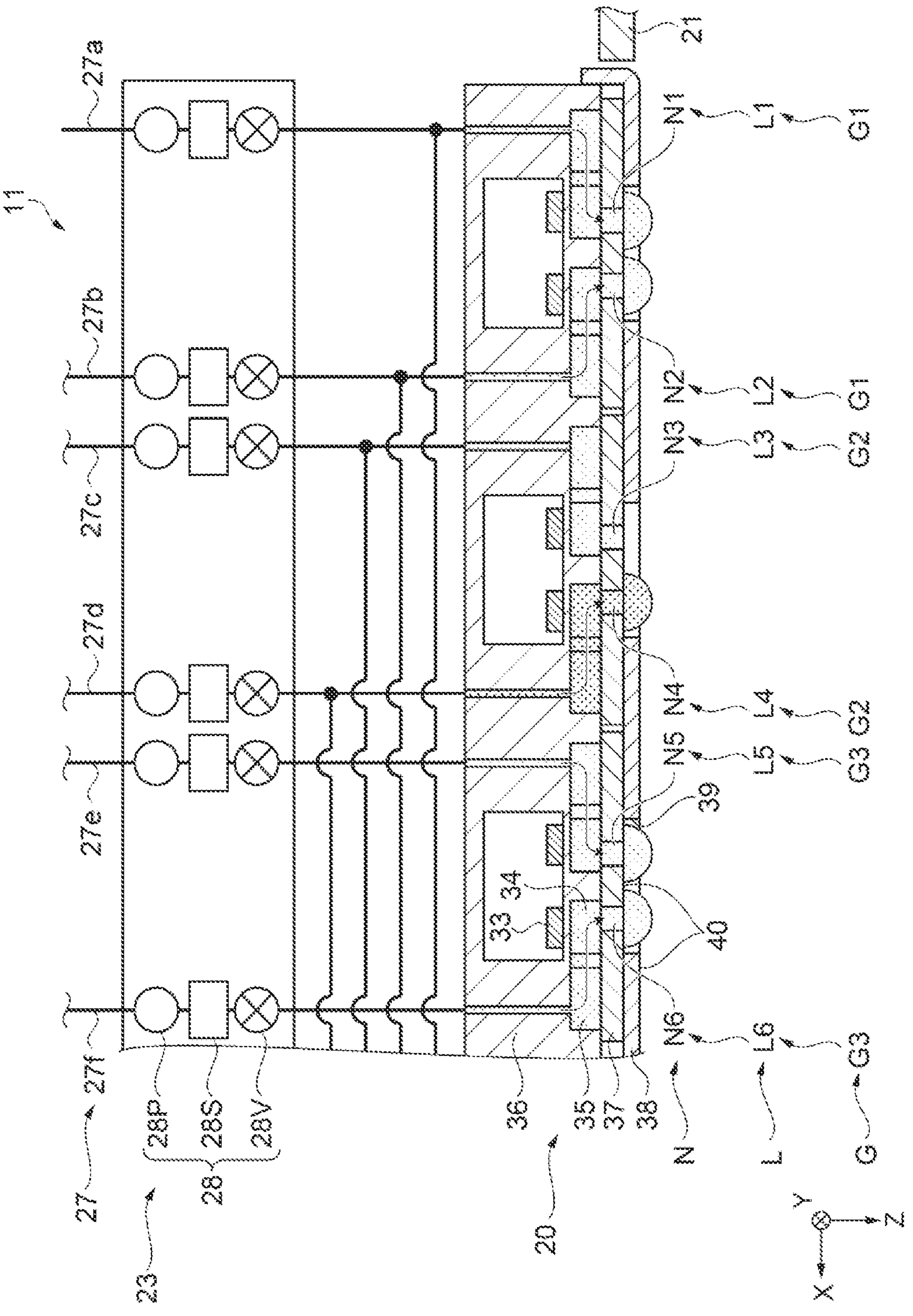
FIG. 14 is a schematic partial cross-sectional view illustrating a state of the vicinity of the liquid ejection portion in the pressurization cleaning.

As a result, the pressurized liquid supplied to each of the nozzles N other than the nozzle N3 among the nozzles N illustrated in FIG. 14 is discharged from each of the nozzles N and remains in the inflated state from the nozzle surface 40 in a droplet shape.

For example, the black ink is discharged from the plurality of nozzles N4 constituting the nozzle row L4 of the nozzle group G2, and remains in the inflated state from the nozzle surface 40 in a droplet shape. On the other hand, since the cyan ink is not discharged from the plurality of nozzles N3 constituting the nozzle row L3 of the nozzle group G2, droplets of the cyan ink are not formed.

Figure 15:
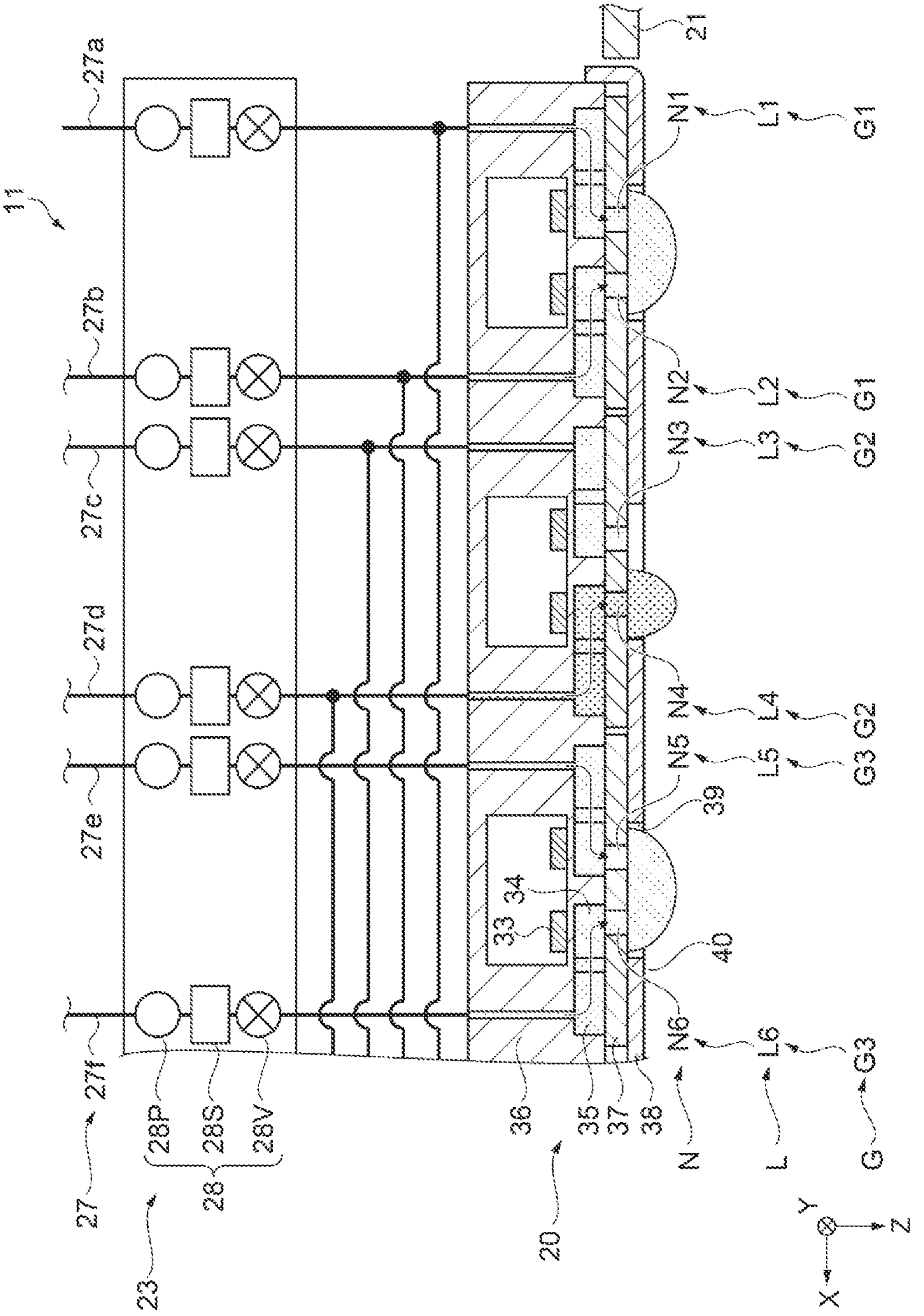
FIG. 15 is a schematic partial cross-sectional view illustrating a state of the vicinity of the liquid ejection portion in the pressurization cleaning.

Subsequently, the control portion 29 continues the supplying of the pressurized liquid to each of the nozzles N other than the nozzles N3 and N10. As a result, as illustrated in FIG. 15, the liquid inflated in a droplet shape from the nozzle surface 40 in which the nozzles N1 and N2 constituting the nozzle group G1 are open and the nozzle surface 40 in which the nozzles N5 and N6 constituting the nozzle group G3 are open is in a state in which the adjacent droplets are coupled to each other and are in an inflated state in a large droplet shape.

On the other hand, on the nozzle surface 40 in which the nozzles N3 and N4 constituting the nozzle group G2 are open, the droplet-shaped black ink are in a largely inflated state. Thus, the proportion of carbon black of the black ink in the liquid that remains in the inflated state in a droplet shape on the nozzle surface 40 in which the nozzles N3 and N4 constituting the nozzle group G2 are open is the same as the proportion of the carbon black in the black ink.

Figure 16:
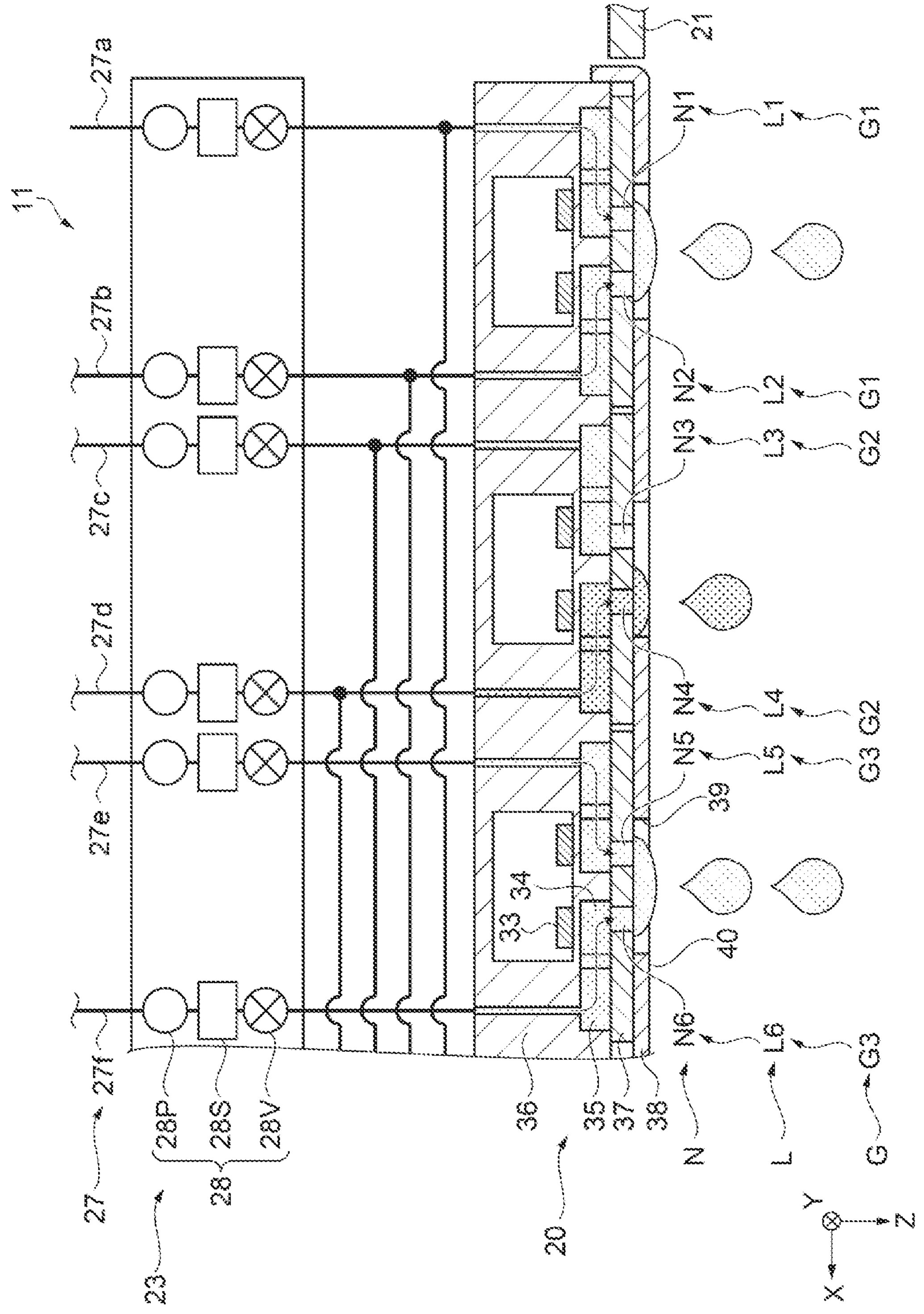
FIG. 16 is a schematic partial cross-sectional view illustrating a state of the vicinity of the liquid ejection portion in the pressurization cleaning.

As illustrated in FIG. 16, a part of the liquid in which a size of the droplet remaining on the nozzle surface 40 is greater than the size that can remain on the nozzle surface 40 drops from the nozzle surface 40. As a result, the amount of droplet-shaped liquid that remains on the nozzle surface 40 is reduced. The control portion 29 continues the supplying of the pressurized liquid to each of the nozzles N. Thus, the enlargement of the droplets on the nozzle surface 40, the dropping of the droplets from the nozzle surface 40, and the contraction of the droplets on the nozzle surface 40 are repeated.

Figure 17:
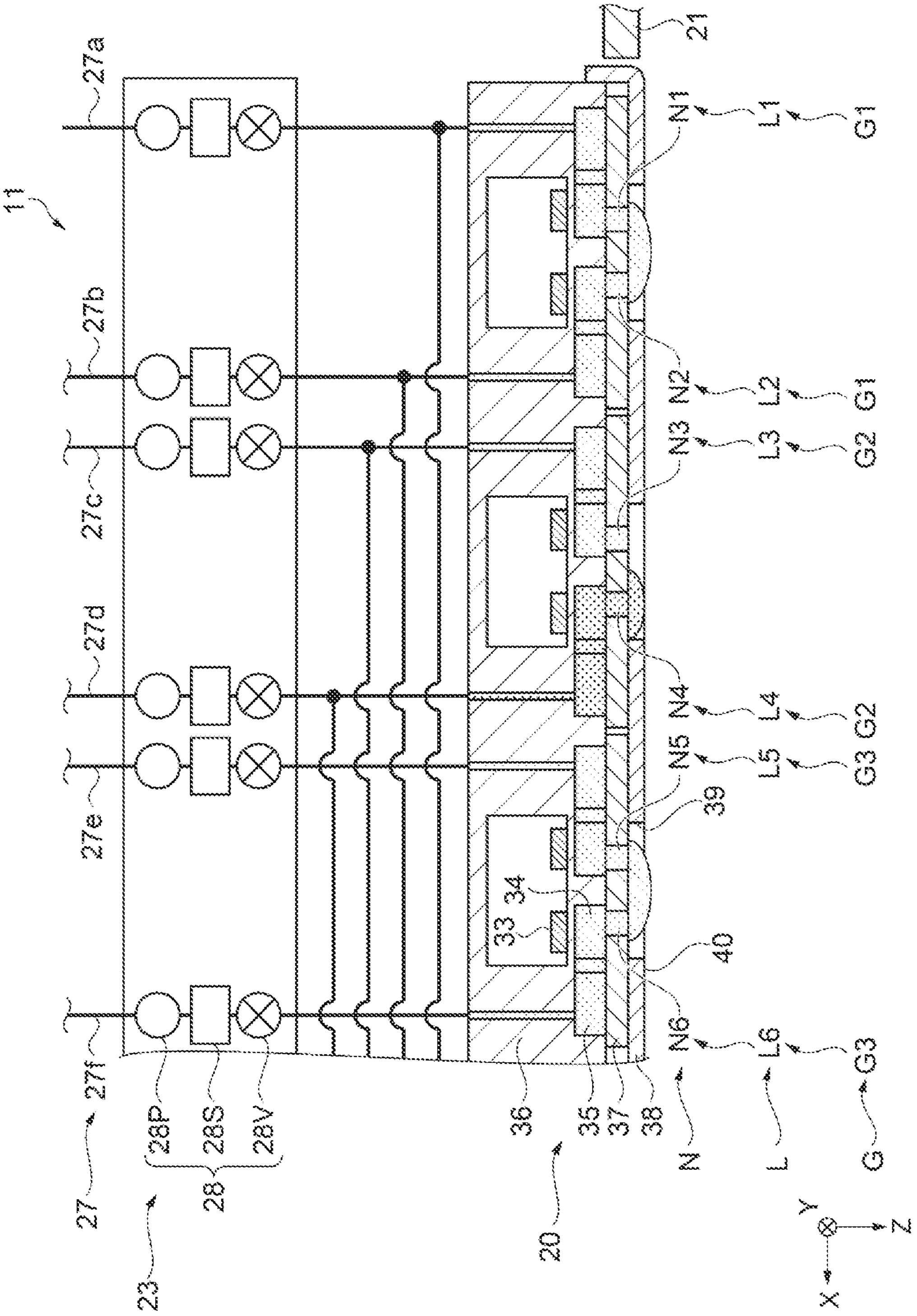
FIG. 17 is a schematic partial cross-sectional view illustrating a state of the vicinity of the liquid ejection portion in the pressurization cleaning.

Subsequently, as illustrated in FIG. 17, when the amount of liquid supplied to each of the nozzles N other than the nozzles N3 and N10 reaches the set amount A, the control portion 29 controls the liquid flow mechanism 28 to close each of the opening-closing valves 28V provided in the supply flow passages 27*a*, 27*b*, 27*d*, 27*e*, 27*f*, and 27*g*. Thus, the control portion 29 stops the supplying of the liquid from the supply flow passages 27*a*, 27*b*, 27*d*, 27*e*, 27*f*, and 27*g*.

At this time, for example, the supply amount of the black ink supplied to the nozzle N4 is the set amount A. When the discharging of the liquid from each of the nozzles N other than the nozzles N3 and N10 is stopped, the control portion 29 starts the supplying of the pressurized liquid to the nozzles N3 and N10 by opening the opening-closing valve 28V provided in the supply flow passage 27*c*. In other words, in the pressurization cleaning, the control portion 29 starts the discharging of the cyan ink after the discharging of the black ink is completed.

Figure 18:
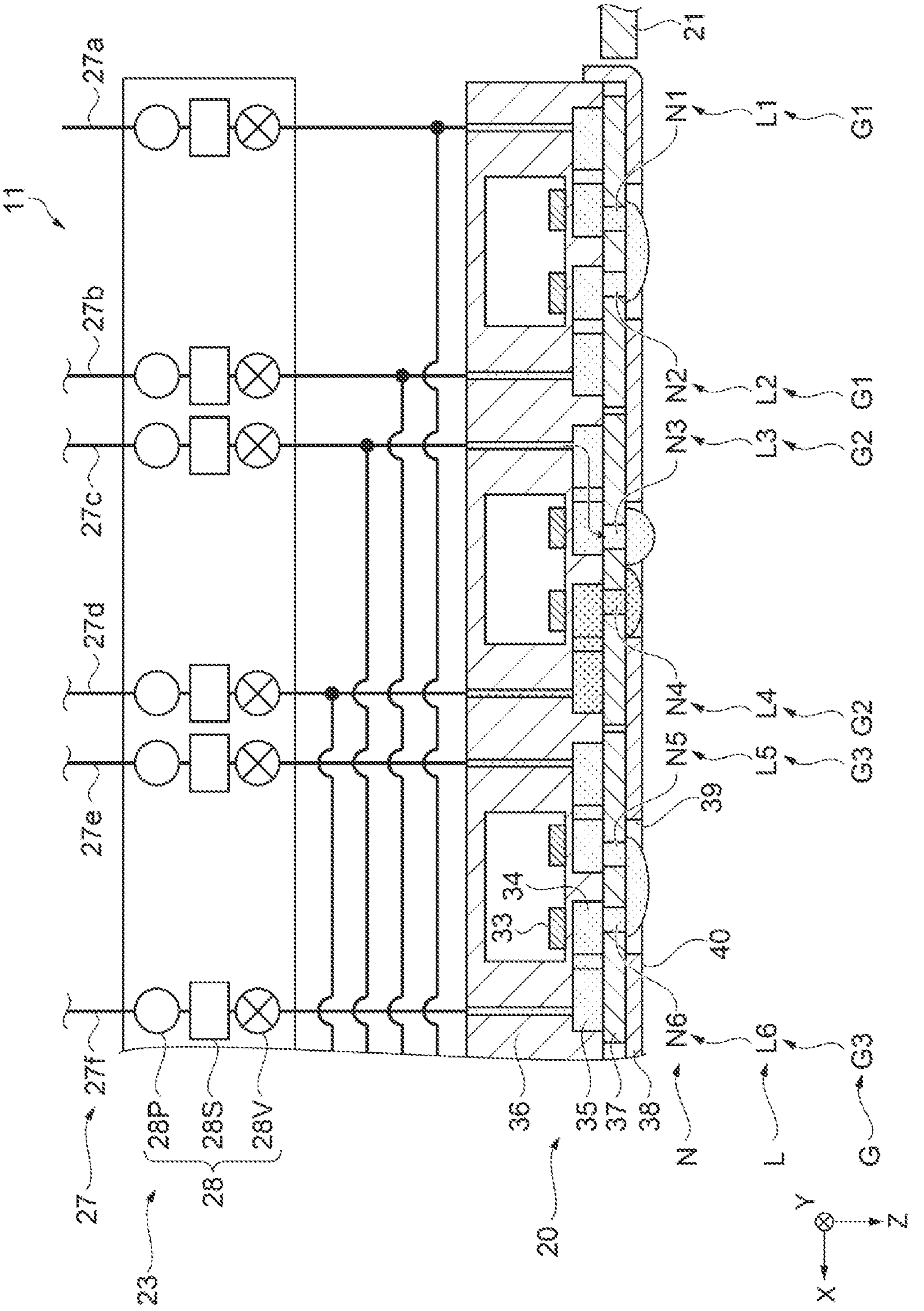
FIG. 18 is a schematic partial cross-sectional view illustrating a state of the vicinity of the liquid ejection portion in the pressurization cleaning.

Thus, as illustrated in FIG. 18, for example, the cyan ink is discharged from the nozzle N3 onto the nozzle surface 40 in which the nozzles N3 and N4 constituting the nozzle group G2 are open, and remains in the inflated state in a droplet shape from the nozzle surface 40. Subsequently, the control portion 29 continues the supplying of the pressurized cyan ink to the nozzle N3.

Figure 19:
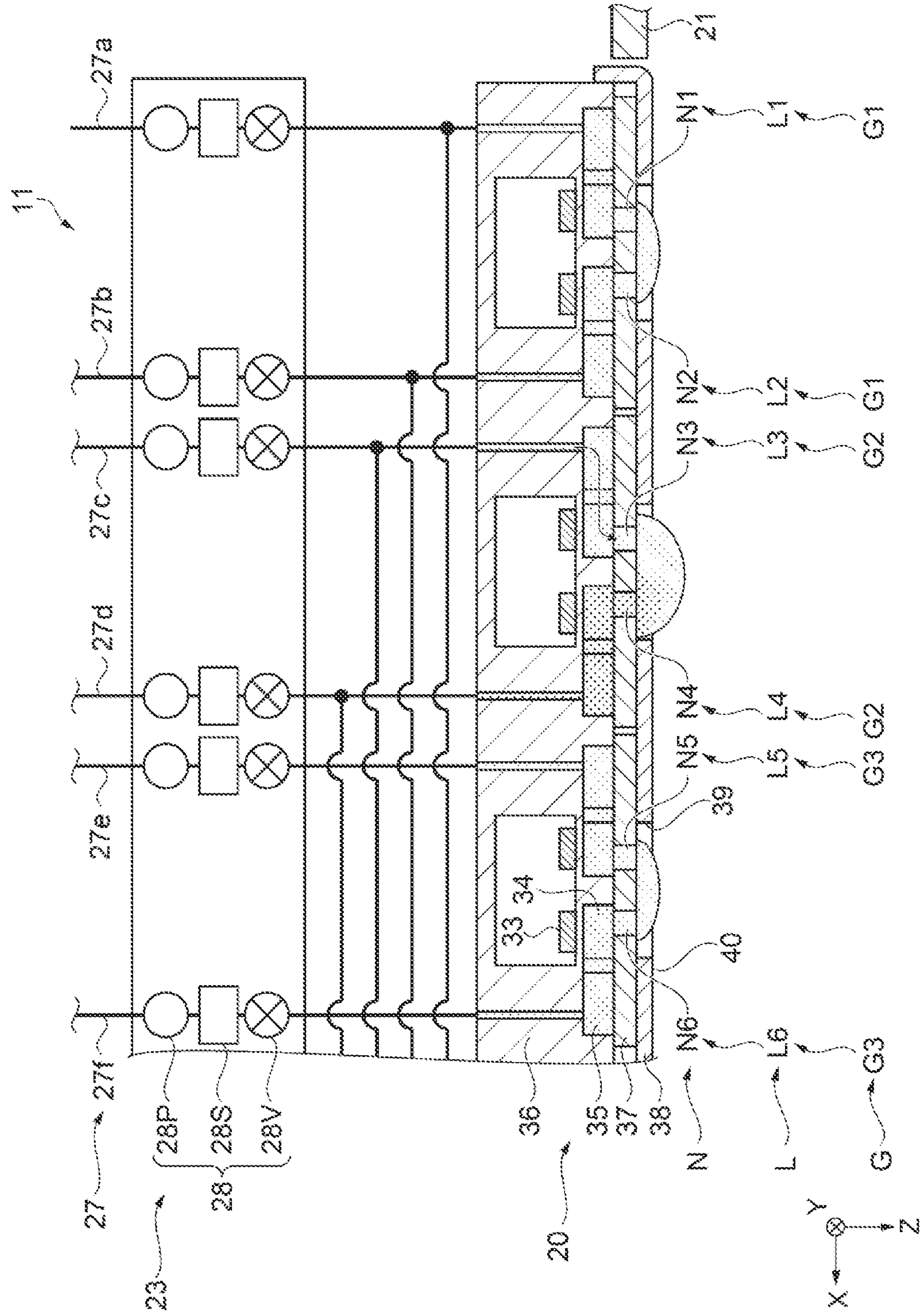
FIG. 19 is a schematic partial cross-sectional view illustrating a state of the vicinity of the liquid ejection portion in the pressurization cleaning.

As a result, as illustrated in FIG. 19, the droplets of the cyan ink inflated in the droplet shape become larger and is coupled to the droplets of the black ink remaining on the nozzle surface 40, and droplets of a mixed liquid including the black ink and the cyan ink are formed. Then, the cyan ink supplied from the supply flow passage 27*c* as indicated by the arrows is mixed with the droplets of the mixed liquid through the nozzle N3. As a result, the proportion of carbon black of the black ink in the mixed liquid remaining in the inflated state in a droplet shape on the nozzle surface 40 becomes smaller than the proportion of the carbon black in the black ink.

Figure 20:
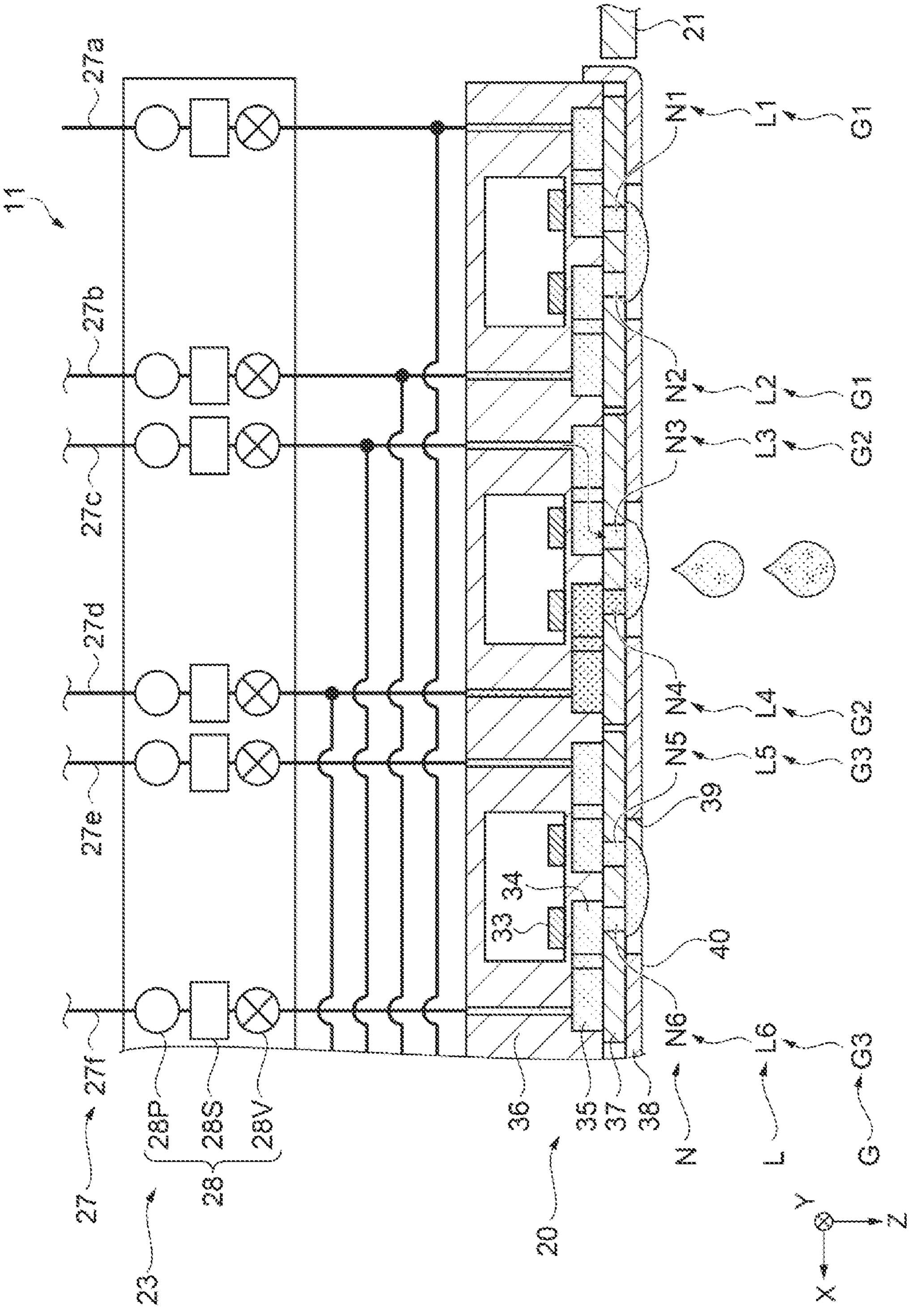
FIG. 20 is a schematic partial cross-sectional view illustrating a state of the vicinity of the liquid ejection portion in the pressurization cleaning.

As illustrated in FIG. 20, a part of the mixed liquid that becomes larger than a size that can remain on the nozzle surface 40 drops from the nozzle surface 40 in which the nozzles N3 and N4 constituting the nozzle group G2 are open. As a result, the amount of droplet-shaped liquid that remains on the nozzle surface 40 in which the nozzles N3 and N4 constituting the nozzle group G2 are open is reduced. The control portion 29 continues the supplying of the pressurized cyan ink to each of the nozzles N3 and N10. Thus, the enlargement of the droplets on the nozzle surface 40, the dropping of the droplets from the nozzle surface 40, and the contraction of the droplets on the nozzle surface 40 are repeated.

Figure 21:
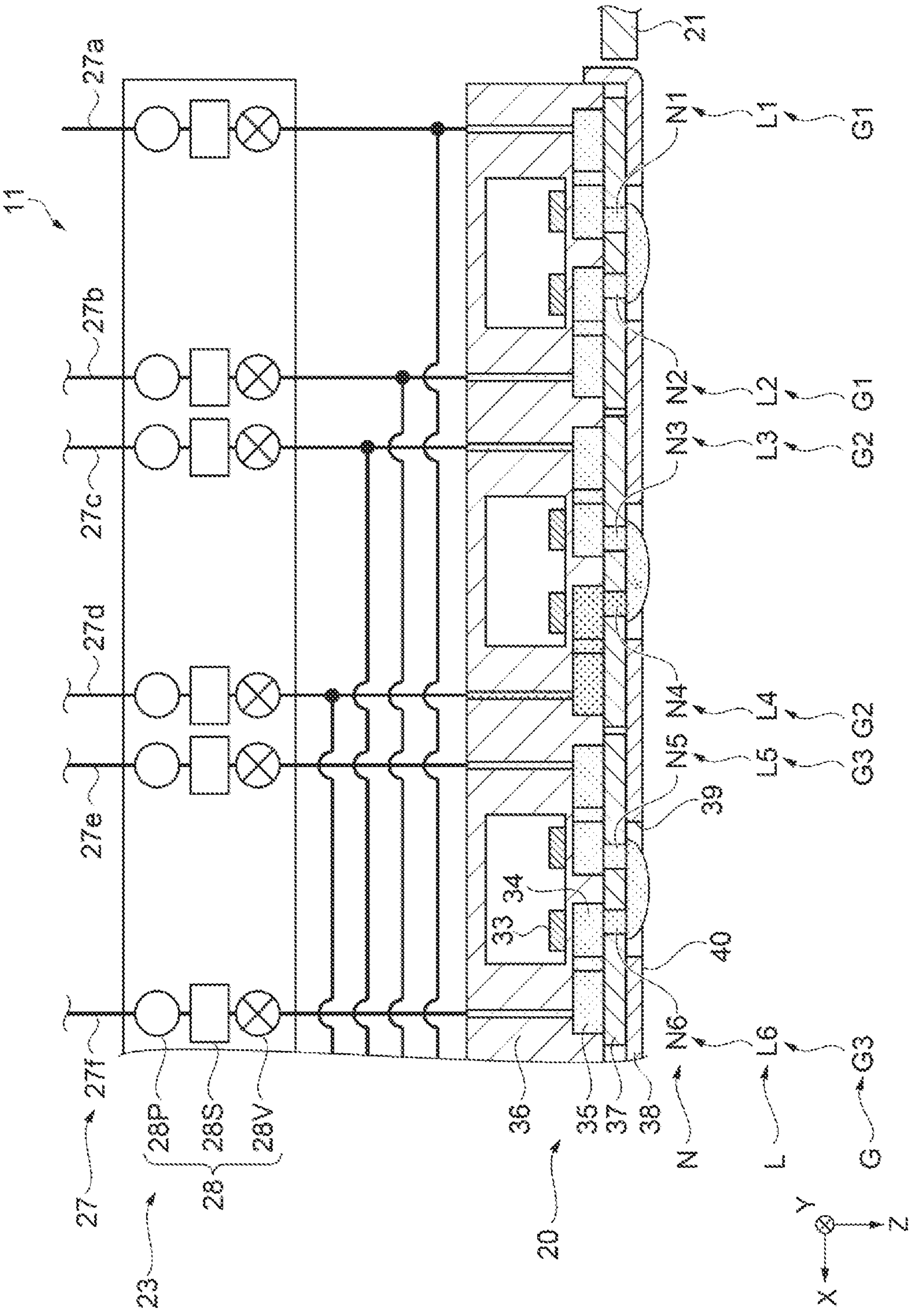
FIG. 21 is a schematic partial cross-sectional view illustrating a state of the vicinity of the liquid ejection portion in the pressurization cleaning.

Subsequently, as illustrated in FIG. 21, when the supply amount of the cyan ink to each of the nozzles N3 and N10 reaches the set amount A, the control portion 29 controls the liquid flow mechanism 28 to close the opening-closing valve 28V provided in the supply flow passage 27*c*, stops the supplying of the cyan ink from the supply flow passage 27*c*, and ends the pressurization cleaning. At this time, an amount of droplet-shaped liquid that remains on the nozzle surface 40 in which the nozzles N3 and N4 constituting the nozzle group G2 are open in FIG. 21 is less than an amount of droplet-shaped liquid that remains on the nozzle surface 40 in which the nozzles N3 and N4 constituting the nozzle group G2 are open in FIG. 19. In other words, the amount of droplet-shaped mixed liquid that remains on the nozzle surface 40 in which the nozzles N3 and N4 constituting the nozzle group G2 are open is also reduced.

When the cyan ink is supplied until the black ink droplets remaining on the nozzle surface 40 illustrated in FIG. 17 are coupled to the cyan ink discharged from the nozzle N3 and thus drop from the nozzle surface 40, the control portion 29 may close the opening-closing valve 28V provided in the supply flow passage 27*c* and may end the pressurization cleaning. In this case, in the pressurization cleaning, the supply amount of the cyan ink supplied to each of the nozzles N3 and N10 may be less than the set amount A. In other words, in the pressurization cleaning, the amount of the cyan ink discharged from the nozzle N3 may be less than the amount of black ink discharged from the nozzle N4.

As described above, according to the liquid ejection device 11 and the method for controlling the liquid ejection device according to Embodiment 1, the following effects can be obtained.

The liquid ejection device 11 includes a liquid ejection portion 20 including a plurality of nozzles N4 configured to eject a black ink including carbon black and a plurality of nozzles N3 configured to eject a cyan ink not containing a substance having a hardness the same as or higher than a hardness of carbon black contained in the black ink, a liquid flow mechanism 28 configured to perform maintenance on the liquid ejection portion 20 by pressurization cleaning in which discharging of the black ink from the plurality of nozzles N4 and discharging of the cyan ink from the plurality of nozzles N3 are performed, a liquid collection device 43 including a band-shaped member 60 configured to absorb a liquid and to wipe a nozzle surface 40 provided with the plurality of nozzles N4 and the plurality of nozzles N3 with the band-shaped member 60, and a control portion 29 configured to control the liquid flow mechanism 28 and the liquid collection device 43. Then, the control portion 29 performs the pressurization cleaning with the liquid flow mechanism 28 such that a proportion of the carbon black of the black ink in the mixed liquid containing the black ink and the cyan ink and remaining on the nozzle surface 40 is smaller than a proportion of the carbon black in the black ink, and then performs wiping of the nozzle surface 40 with the liquid collection device 43. Thus, it is possible to reduce the amount of the carbon black that remains on the nozzle surface 40 in comparison to a case in which the cleaning of discharging the black ink from the nozzle N4 without discharging the cyan ink from the nozzle N3 is performed. Thus, damage to the nozzle surface 40 by the carbon black can be suppressed in the wiping by the liquid collection device 43.

In the pressurization cleaning, the control portion 29 completes the discharging of the cyan ink after the discharging of the black ink is completed. Thus, it is possible to easily reduce the amount of the carbon black that remains on the nozzle surface 40 in the pressurization cleaning.

In the pressurization cleaning, the control portion 29 starts the discharging of the cyan ink after the discharging of the black ink is completed. Thus, it is possible to easily reduce the amount of the carbon black that remains on the nozzle surface 40 in the pressurization cleaning.

In the pressurization cleaning, the control portion 29 discharges the cyan ink more than the black ink. Thus, it is possible to easily reduce the amount of the carbon black that remains on the nozzle surface 40 in the pressurization cleaning.

The plurality of nozzle N4 and the plurality of nozzles N3 are provided at adjacent positions. Thus, it is possible to easily mix the black ink and the cyan ink that remain on the nozzle surface 40 in the pressurization cleaning. Then, the amount of the carbon black that remains on the nozzle surface 40 can be easily reduced by dropping the mixed liquid including the black ink and the cyan ink.

The cyan ink is a liquid that does not contain an inorganic pigment. Thus, it is possible to reduce damage to the nozzle surface 40 caused by the inorganic pigment in the wiping by the liquid collection device 43.

A method for controlling a liquid ejection device 11 which includes a liquid ejection portion 20 including a plurality of nozzles N4 configured to eject a black ink including carbon black and a plurality of nozzles N3 configured to eject a cyan ink not containing a substance having a hardness the same as or higher than a hardness of carbon black contained in the black ink, a liquid flow mechanism 28 configured to perform maintenance on the liquid ejection portion 20 by pressurization cleaning in which discharging of the black ink from the plurality of nozzles N4 and discharging of the cyan ink from the plurality of nozzles N3 are performed, and a liquid collection device 43 including a band-shaped member 60 configured to absorb a liquid and to wipe a nozzle surface 40 provided with the plurality of nozzles N4 and the plurality of nozzles N3 with the band-shaped member 60, includes performing the pressurization cleaning such that a proportion of the carbon black of the black ink in the mixed liquid containing the black ink and the cyan ink and remaining on the nozzle surface 40 is smaller than a proportion of the carbon black in the black ink, and performing wiping of the nozzle surface 40 with the liquid collection device 43 after the pressurization cleaning is performed. Thus, it is possible to reduce the amount of the carbon black that remains on the nozzle surface 40 in comparison to the case in which the cleaning of discharging the black ink from the nozzle N4 is performed without discharging the cyan ink from the nozzle N3. Thus, damage to the nozzle surface 40 by the carbon black can be suppressed in the wiping by the liquid collection device 43. In addition, accordingly, it is possible to ensure a life of the liquid ejection device 11 equivalent to when the ink does not include an inorganic pigment.

The method of controlling a liquid ejection device completes the discharging of the cyan ink after the discharging of the black ink is completed in the pressurization cleaning. Thus, it is possible to easily reduce the amount of the carbon black that remains on the nozzle surface 40 in the pressurization cleaning.

In the method for controlling a liquid ejection device, in the pressurization cleaning, the discharging of the cyan ink is started after the discharging of the black ink is completed. Thus, it is possible to easily reduce the amount of the carbon black that remains on the nozzle surface 40 in the pressurization cleaning.

The method for controlling a liquid ejection device discharges the cyan ink more than the black ink in the pressurization cleaning. Thus, it is possible to easily reduce the amount of the carbon black that remains on the nozzle surface 40 in the pressurization cleaning.

Although the liquid ejection device 11 and the method for controlling the liquid ejection device according to the above embodiment of the present disclosure are based on having the configuration as described above, it is possible to change or omit a partial configuration within a range that does not deviate from the gist of the present disclosure. Further, the above embodiment and other embodiments described below can be combined with each other within a technically consistent range. Other exemplary embodiments will be described below.

In the above embodiment, the liquid supplied to the plurality of nozzles N3, which is an example of the plurality of second nozzles, and then ejected and discharged need not be the cyan ink as long as it is a liquid that does not contain a substance having a hardness the same as or higher than a hardness of carbon black of the black ink, which is an example of a first liquid supplied to the plurality of nozzles N4, which is an example of a plurality of first nozzles, and then ejected and discharged. For example, the liquid ejected and discharged to the nozzle N3 may be any one of a magenta ink, a yellow ink, a light cyan ink, and a light magenta ink in the above embodiments that contain an organic pigment and do not contain an inorganic pigment. In this case, any one of the magenta ink, the yellow ink, the light cyan ink, and the light magenta ink is an example of a second liquid.

In the above embodiment, the liquid supplied to the plurality of nozzles N3, which is an example of the plurality of second nozzles, and then ejected and discharged need not be a pigment ink as long as it is a liquid that does not contain a substance having a hardness the same as or higher than a hardness of carbon black of the black ink, which is an example of the first liquid supplied to the plurality of nozzles N4, which is an example of a plurality of first nozzles, and then ejected and discharged. For example, the liquid supplied to the nozzle N3 and then ejected and discharged may be a so-called dye ink containing water as a solvent and containing dye as a coloring component. In this case, the dye ink described above is an example of the second liquid.

In the above embodiment, the liquid supplied to the plurality of nozzles N3, which is an example of the plurality of second nozzles, and then ejected and discharged need not be ink as long as it is a liquid that does not contain a substance having a hardness the same as or higher than a hardness of carbon black of the black ink, which is an example of the first liquid supplied to the plurality of nozzles N4, which is an example of a plurality of first nozzles, and then ejected and discharged. For example, the liquid supplied to the plurality of nozzles N3 and then ejected and discharged may be a cleaning liquid ejected and discharged to the suction cap 51 to clean the suction cap 51 of the suction device 44. Alternatively, it may be a wetting liquid ejected and discharged to the standby cap 56 to ensure a wet state of the standby cap 56 of the capping device 45. Furthermore, the cleaning liquid and the wetting liquid need not contain a coloring component, or may be water. In this case, any one of the cleaning liquid and the wetting liquid described above is an example of the second liquid.

In the embodiment described above, the liquid supplied to the plurality of nozzles N4, which is an example of the plurality of first nozzles, and then ejected and discharged need not be a black ink containing carbon black as the inorganic pigment. For example, the liquid supplied to the plurality of nozzles N4 and then ejected and discharged may be a white ink containing a white inorganic pigment as an inorganic pigment. For example, in the white ink, an alkaline earth metal sulfate such as barium sulfate, an alkaline earth metal carbonate such as calcium carbonate, silicas such as micronized silicic acid and synthetic silicates, a metallic compound such as calcium silicate, alumina, alumina hydrate, titanium oxide, and zinc oxide, as well as talc and clay, and the like may be used as the white inorganic pigment. In this case, the white ink containing the white inorganic pigment described above as an inorganic pigment is an example of a first liquid. In addition, in this case, the second liquid supplied to the nozzle N3, which is an example of the second nozzle, and then ejected and discharged may be any one of the cyan ink, the magenta ink, the yellow ink, the light cyan ink, and the light magenta ink in the above embodiment that contain an organic pigment and do not contain an inorganic substance.

In the embodiment described above, the liquid supplied to the plurality of nozzles N4, which is an example of the plurality of first nozzles, and then ejected and discharged need not be a black ink containing carbon black as an inorganic pigment. For example, the liquid supplied to the plurality of nozzles N4 and then ejected and discharged may be a white ink containing titanium oxide as a white inorganic pigment. A Mohs hardness of titanium oxide is 5.5 to 7.5. In this case, the white ink containing the white inorganic pigment described above as an inorganic pigment is an example of the first liquid. In addition, in this case, the liquid supplied to the plurality of nozzles N3, which is an example of the plurality of second nozzles, and then ejected and discharged may be a black ink in the above embodiment not including a substance having a hardness the same as or higher than a hardness of titanium oxide and including a carbon black having a hardness lower than that of the titanium oxide contained in the white ink described above. Then, in this case, the black ink in the above embodiment is an example of the second liquid including carbon black having a hardness lower than that of the titanium oxide contained in the white ink described above. Further, accordingly, an amount of titanium oxide remaining on the nozzle surface 40 can be reduced in comparison to a case in which cleaning in which the white ink is discharged from nozzle N4 without discharging the black ink from nozzle N3 is performed. Thus, damage to the nozzle surface 40 by titanium oxide having a hardness higher than that of the carbon black can be suppressed in the wiping by the liquid collection device 43.

In the above embodiment, the plurality of through holes 39 need not be formed in the cover member 38. For example, one through hole 39 may be formed in the cover member 38 so that the nozzle N is exposed. Alternatively, the liquid ejection portion 20 need not include the cover member 38.

In the embodiment described above, the liquid discharged from the liquid ejection portion 20 in the pressurization cleaning and the flushing need not be collected by the band-shaped member 60 of the liquid collection device 43. For example, the liquid may be collected by a liquid receiving member provided separately from the liquid collection device 43.

What is claimed is:

1. A liquid ejection device comprising:

a liquid ejection portion including a plurality of first nozzles configured to eject a first liquid containing an inorganic pigment and a plurality of second nozzles configured to eject a second liquid not containing a substance having a hardness the same as or higher than a hardness of the inorganic pigment contained in the first liquid;

a cleaning portion configured to perform maintenance on the liquid ejection portion by cleaning in which discharging of the first liquid from the plurality of first nozzles and discharging of the second liquid from the plurality of second nozzles are performed;

a wiping portion including an absorbent member and configured to wipe, with the absorbent member, a nozzle surface provided with the plurality of first nozzles and the plurality of second nozzles, the absorbent member being configured to absorb a liquid; and a control portion configured to control the cleaning portion and the wiping portion, wherein the control portion performs the cleaning with the cleaning portion such that a proportion of the inorganic pigment of the first liquid in a mixed liquid, remaining on the nozzle surface, containing the first liquid and the second liquid is smaller than a proportion of the inorganic pigment in the first liquid, and then performs wiping of the nozzle surface with the wiping portion, and in the cleaning, the control portion completes the discharging of the second liquid after the discharging of the first liquid is completed.

2. A liquid ejection device comprising:

a liquid ejection portion including a plurality of first nozzles configured to eject a first liquid containing an inorganic pigment and a plurality of second nozzles configured to eject a second liquid not containing a substance having a hardness the same as or higher than a hardness of the inorganic pigment contained in the first liquid;

a cleaning portion configured to perform maintenance on the liquid ejection portion by cleaning in which discharging of the first liquid from the plurality of first nozzles and discharging of the second liquid from the plurality of second nozzles are performed;

a wiping portion including an absorbent member and configured to wipe, with the absorbent member, a nozzle surface provided with the plurality of first nozzles and the plurality of second nozzles, the absorbent member being configured to absorb a liquid; and a control portion configured to control the cleaning portion and the wiping portion, wherein the control portion performs the cleaning with the cleaning portion such that a proportion of the inorganic pigment of the first liquid in a mixed liquid, remaining on the nozzle surface, containing the first liquid and the second liquid is smaller than a proportion of the inorganic pigment in the first liquid, and then performs wiping of the nozzle surface with the wiping portion, and in the cleaning, the control portion starts the discharging of the second liquid after the discharging of the first liquid is completed.

3. The liquid ejection device according to claim 1, wherein in the cleaning, the control portion discharges the second liquid more than the first liquid.

4. The liquid ejection device according to claim 1, wherein the plurality of first nozzles and the plurality of second nozzles are provided at positions adjacent to each other.

5. The liquid ejection device according to claim 1, wherein the second liquid is a liquid not containing an inorganic pigment.

6. The liquid ejection device according to claim 1, wherein the second liquid is a liquid containing an inorganic pigment having a hardness lower than that of the inorganic pigment contained in the first liquid.

7. A method for controlling a liquid ejection device, the liquid ejection device including:

a liquid ejection portion including a plurality of first nozzles configured to eject a first liquid containing an inorganic pigment and a plurality of second nozzles configured to eject a second liquid not containing a substance having a hardness the same as or higher than a hardness of the inorganic pigment contained in the first liquid, a cleaning portion configured to perform maintenance on the liquid ejection portion by cleaning in which discharging of the first liquid from the plurality of first nozzles and discharging of the second liquid from the plurality of second nozzles are performed, and a wiping portion including an absorbent member and configured to wipe, with the absorbent member, a nozzle surface provided with the plurality of first nozzles and the plurality of second nozzles, the absorbent member being configured to absorb a liquid, the method comprising:

performing the cleaning such that a proportion of the inorganic pigment of the first liquid in a mixed liquid, remaining on the nozzle surface, containing the first liquid and the second liquid is smaller than a proportion of the inorganic pigment in the first liquid; and performing wiping of the nozzle surface with the wiping portion after the cleaning is performed, wherein in the cleaning, the second liquid is discharged more than the first liquid.

8. The method for controlling a liquid ejection device according to claim 7, wherein in the cleaning, the discharging of the second liquid is completed after the discharging of the first liquid is completed.

9. The method for controlling a liquid ejection device according to claim 7, wherein in the cleaning, the discharging of the second liquid is started after the discharging of the first liquid is completed.

* * * * *